(12) United States Patent
Jeong et al.

(10) Patent No.: US 10,775,484 B2
(45) Date of Patent: Sep. 15, 2020

(54) LIDAR APPARATUS FOR VEHICLES AND VEHICLE HAVING THE SAME

(71) Applicant: LG ELECTRONICS INC., Seoul (KR)

(72) Inventors: Seongyun Jeong, Seoul (KR); Jejong Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 632 days.

(21) Appl. No.: 15/617,209

(22) Filed: Jun. 8, 2017

(65) Prior Publication Data

US 2017/0356983 A1 Dec. 14, 2017

(30) Foreign Application Priority Data

Jun. 8, 2016 (KR) .................. 10-2016-0070679

(51) Int. Cl.
| | | |
|---|---|---|
| *G01S 7/481* | (2006.01) | |
| *G01S 17/93* | (2020.01) | |
| *G01S 17/42* | (2006.01) | |
| *G01S 17/58* | (2006.01) | |
| *G02F 1/29* | (2006.01) | |
| *G01S 17/34* | (2020.01) | |
| *G01S 17/931* | (2020.01) | |

(52) U.S. Cl.
CPC .......... *G01S 7/4817* (2013.01); *G01S 7/4818* (2013.01); *G01S 17/34* (2020.01); *G01S 17/42* (2013.01); *G01S 17/58* (2013.01); *G01S 17/931* (2020.01); *G02F 1/292* (2013.01)

(58) Field of Classification Search
CPC .... G01S 7/4817; G01S 17/936; G01S 7/4818; G01S 17/42; G01S 17/325; G01S 17/58; G01S 17/34; G01S 17/931; G02F 1/292

USPC ........................................ 356/4.01
See application file for complete search history.

(56) References Cited

U.S. PATENT DOCUMENTS

| | | | | |
|---|---|---|---|---|
| 4,632,543 A | * | 12/1986 | Endo ................. | B60K 31/0008 180/167 |
| 2011/0019154 A1 | * | 1/2011 | Jennings ............. | F41G 7/002 353/11 |
| 2015/0346340 A1 | * | 12/2015 | Yaacobi ............... | G01S 7/4817 356/5.11 |

FOREIGN PATENT DOCUMENTS

| | | |
|---|---|---|
| JP | 2004-125739 | 4/2004 |
| KR | 10-2000-0019326 | 4/2000 |
| KR | 10-2013-0046135 | 5/2013 |
| KR | 10-2015-0106200 | 9/2015 |
| KR | 10-2016-0018024 | 2/2016 |

OTHER PUBLICATIONS

DeRose et al., "Low Power and Broadband 2 × 2 Silicon Thermo-Optic Switch", Optical Society of America, OThM3, (2011), 3 pages. (Year: 2011).*

* cited by examiner

*Primary Examiner* — Daniel L Murphy
(74) *Attorney, Agent, or Firm* — Fish & Richardson P.C.

(57) ABSTRACT

A light detection and ranging (lidar) apparatus for a vehicle may include: a transmission unit configured to output transmission light; a reception unit configured to receive reflection light that results from the transmission light being reflected by an object; and at least one processor. The at least one processor may be configured to: based on a driving state of the vehicle, adjust an angle of beam steering of the transmission light.

20 Claims, 20 Drawing Sheets

FIG. 6B

| Core material | Silica on glass | SiON | Silica on Insulator | SiO2/Si3N4 | GaAs and Inp | Lithium Miobate |
|---|---|---|---|---|---|---|
| Bending radius (mm) | 10-20 | 0.2-0.8 | 0.02 | 0.05 | 0.1 | 02 |
| Attenuation (dB/cm) | <0.05 | 0.05-0.3 | <2 | 0.05 | -2.5 | <0.2 |
| Transparency | Visible-near Infrared | Visible-near Infrared | Near Infrared | VIS-IR | Near Infrared | Near Infrared |
| Fiber-chip cupling | +++ | + | – | +++ | -- | + |

Φ : 0°

Φ : 40°

Φ : 70°

LIDAR APPARATUS FOR VEHICLES AND VEHICLE HAVING THE SAME

CROSS-REFERENCE TO RELATED APPLICATION

This application claims the benefit of an earlier filing date and right of priority to Korean Patent Application No. 10-2016-0070679, filed on Jun. 8, 2016 in the Korean Intellectual Property Office, the disclosure of which is incorporated herein by reference.

TECHNICAL FIELD

The present disclosure generally relates to a light detection and ranging apparatus for vehicles and a vehicle having the same.

BACKGROUND

A vehicle is an apparatus that transports people or materials in a direction that is desired by a user. A common example of a vehicle is an automobile.

Vehicles typically implement a variety of sensors and electronic devices designed to improve the convenience of users of the vehicles. As an example, some vehicles implement an Advanced Driver Assistance System (ADAS) that utilizes data from sensors and other electronic devices to assist drivers. In addition, autonomous vehicles have been actively developed, which are designed to autonomously perform one or more driving operations of the vehicle.

Vehicles, such as those implementing ADAS and those that are autonomous vehicles, typically utilize various kinds of sensors, which include a radar, a light detection and ranging (lidar) apparatus, and/or a camera.

In particular, a lidar apparatus is a sensor that measures distances to objects by transmitting light towards an object and detecting properties of light reflected from the object.

SUMMARY

Implementations described herein provide a lidar apparatus for a vehicle that is configured to perform adaptive beam steering by adjusting an angle of transmission light based on a driving state of the vehicle.

In one aspect, a light detection and ranging (lidar) apparatus for a vehicle may include: a transmission unit configured to output transmission light; a reception unit configured to receive reflection light that results from the transmission light being reflected by an object; and at least one processor. The at least one processor may be configured to: based on a driving state of the vehicle, adjust an angle of beam steering of the transmission light.

In some implementations, the lidar apparatus may further include an interface unit. The at least one processor may be further configured to receive information regarding the driving state of the vehicle through the interface unit.

In some implementations, the information regarding the driving state of the vehicle may include at least one of first information sensed in the vehicle or second information sensed outside the vehicle.

In some implementations, the first information sensed in the vehicle may include at least one of: vehicle attitude information, vehicle driving direction information, vehicle location information, vehicle angle information, vehicle speed information, vehicle acceleration information, vehicle tilt information, vehicle forward/reverse movement information, steering-wheel rotation angle information, information regarding a pressure applied to an accelerator pedal, or information regarding a pressure applied to a brake pedal.

In some implementations, the second information sensed outside the vehicle may include information regarding an object located outside the vehicle. The object located outside the vehicle may include at least one of a lane in a road, another vehicle, a pedestrian, a light, a traffic signal, a road, a structure, a bump, a geographical feature, or an animal.

In some implementations, the at least one processor may be further configured to generate the information regarding the object based on the reflection light that is received by the reception unit.

In some implementations, the information regarding the driving state of the vehicle may include information regarding an object located around the vehicle.

In some implementations, the at least one processor may be further configured to: determine at least one of a time of flight (TOF) or a phase shift between the transmission light and the reflection light; and acquire the information regarding the object located around the vehicle based on the at least one of the TOF or the phase shift between the transmission light and the reflection light.

In some implementations, the transmission light may include a Frequency Modulated Continuous Wave (FMCW).

In some implementations, the transmission unit may include: an optical generation unit configured to generate the transmission light; and an optical steering unit configured to control a direction of the transmission light.

In some implementations, the optical steering unit may include an optical phased array.

In some implementations, the transmission unit may further include an optical splitter configured to split an input light into a plurality of beams.

In some implementations, the optical phased array of the optical steering unit may be configured to output a plurality of beams that were split by the optical splitter to an outside of the lidar apparatus in a state in which phases of the plurality of beams have been changed.

In some implementations, the transmission unit may further include an optical guide unit configured to guide, to the optical steering unit, the plurality of beams that were split by the optical splitter.

In some implementations, the lidar apparatus may further include: a heater configured to provide heat to the optical guide unit. The at least one processor may be further configured to control the heater to heat the optical guide unit and change at least one phase of the plurality of beams.

In some implementations, the lidar apparatus may further include: a piezoelectric unit configured to apply pressure to the optical guide unit. The at least one processor may be further configured to control the piezoelectric unit to apply pressure to the optical guide unit and change at least one phase of the plurality of beams.

In some implementations, the optical guide unit may include a core that is composed of silicon nitride ($Si_3N_4$) and silicon dioxide ($SiO_2$), and that includes a cladding structure.

In some implementations, the optical guide unit may include: a silicon substrate; a first silicon dioxide layer formed on the silicon substrate; a second silicon dioxide layer formed on the first silicon dioxide layer; a core formed in the second silicon dioxide layer; and a third silicon dioxide layer formed on the second silicon dioxide layer.

In some implementations, the optical steering unit may include an optical switch that is configured to switch between different emission directions of the transmission light to adjust an angle of beam steering of the transmission light.

In another aspect, a vehicle may include a lidar apparatus according to one or more of the implementations described above.

The details of one or more implementations are set forth in the accompanying drawings and the description below. Other features will be apparent from the description and drawings, and from the claims. The description and specific examples below are given by way of illustration only, and various changes and modifications will be apparent.

BRIEF DESCRIPTION OF THE DRAWINGS

FIG. 6B is a diagram illustrating an example of some effects and properties of the optical guide unit according to some implementations;

DETAILED DESCRIPTION

Implementations are disclosed herein that provide a light detection and ranging (lidar) apparatus for a vehicle that adaptively controls light transmission based on a driving state of the vehicle.

In some implementations, the lidar apparatus may be configured to adjust an angle of beam steering of transmission light based on information about travel situations of the vehicle.

In some scenarios, implementations of the present disclosure may have one or more effects as follows.

First, in some implementations, a single lidar apparatus may be utilized for both short distance and long distance operations, thereby offering flexibility for various situations.

Second, in some implementations, the lidar apparatus may perform adaptive control based on an advanced driver assistance system (ADAS) of a vehicle that is being driven.

Third, in some implementations, the lidar apparatus may adaptively change transmission light even without rotating a motor. Typically, in scenarios where a lidar apparatus is not rotated by a motor, an object is detected only within a predetermined field of view of the lidar apparatus. As a result, such motor-less configurations may be unable to satisfactorily detect an object in an adaptive manner based on the travel situation of a vehicle. According to implementations disclosed herein, a lidar apparatus may adaptively operate based on different travel situations of the vehicle, even if the lidar apparatus is not rotated by a motor. Consequently, the lidar apparatus may be implemented in a more secure and stable manner to be operated in extreme situations, such as detecting high speed vehicles.

Effects of the present disclosure are not limited to the aforementioned effects, and other effects may result from implementations disclosed herein.

A vehicle as described in this specification may be any suitable motorized vehicle, such as an automobile, a motorcycle, etc. Hereinafter, description will be given based on an automobile.

A vehicle as described in this specification may be powered by a suitable power source, and may be implemented, for example, as an internal combustion engine vehicle including an engine as a power source, a hybrid vehicle including both an engine and an electric motor as a power source, or an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

Figure 1A:
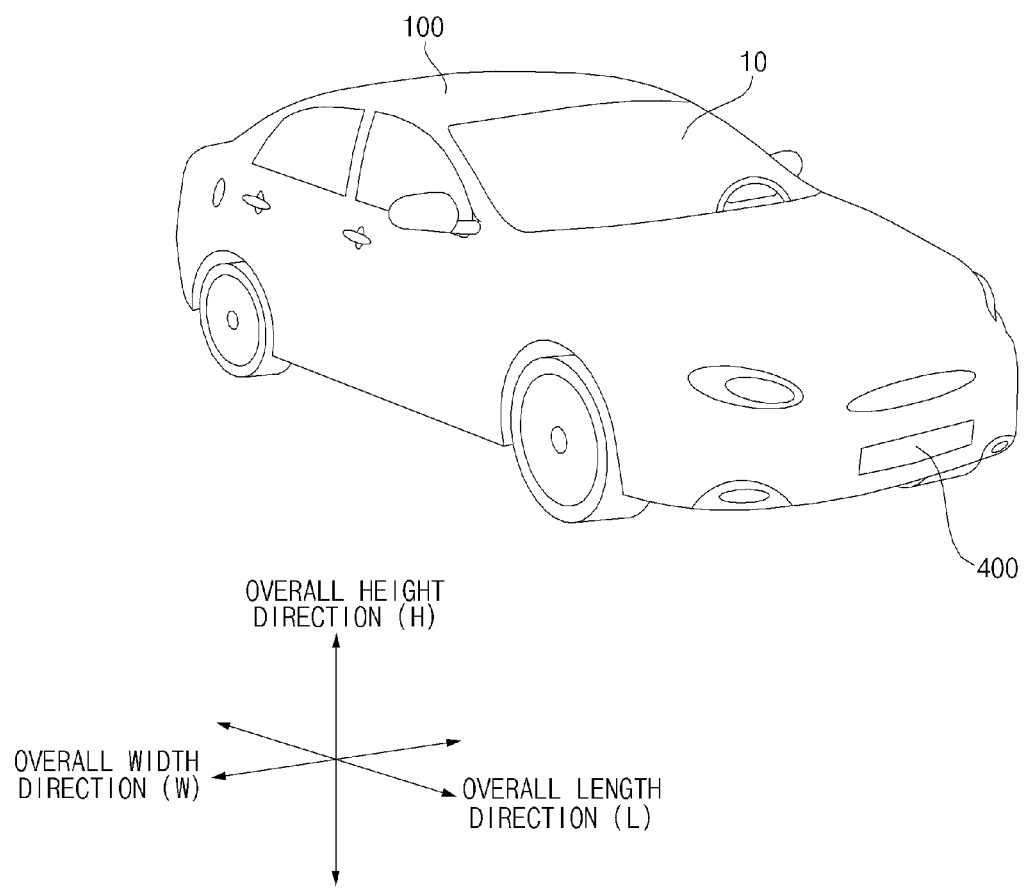
FIG. 1A is a diagram illustrating an example of the external appearance of a vehicle according to some implementations.

FIG. 1A is a view showing the external appearance of a vehicle according to some implementations.

Referring to FIG. 1A, the vehicle 100 may include a plurality of wheels, which are rotated by a power source, and a steering input device for controlling the direction of travel of the vehicle 100.

In some implementations, the vehicle 100 may be an autonomous vehicle that autonomously performs one or more driving operations of the vehicle. The autonomous vehicle may enable bidirectional switching between an autonomous driving mode and a manual mode, e.g., in response to a user input. When switched to the manual mode, the autonomous vehicle 100 may receive a user control, such as a steering input through a steering input device.

The vehicle 100 may include, in some implementations, an advanced driver assistance system, which assists a driver based on information acquired by various kinds of sensors.

For example, the Advanced Driver Assistance System (ADAS) may implement features such as Autonomous Emergency Braking (AEB), Adaptive Cruise Control (ACC), Cross Traffic Alert (CTA), Lane Change Assistant (LCA), Forward Collision Warning (FCW), Lane Departure Warning (LDW), Lane Keeping Assist (LKA), Speed Assist System (SAS), Traffic Sign Recognition (TSR), High Beam Assist (HBA), Blind Spot Detection (BSD), Autonomous Emergency Steering (AES), Curve Speed Warning System (CSWS), Smart Parking Assist System (SPAS), Traffic Jam Assist (TJA), and Around View Monitor (AVM).

As shown in the example of FIG. 1A, the vehicle 100 may include a lidar apparatus 400. In some implementations, the lidar apparatus 400 may be arranged as a sub-component of the advanced driver assistance system. In such scenarios, the advanced driver assistance system may be operated based on information generated by the lidar apparatus 400.

In FIG. 1A, the lidar apparatus 400 is shown as being disposed at the front of the vehicle. However, the present disclosure is not limited thereto. For example, the lidar apparatus 400 may be disposed at the rear, the side, or the roof of the vehicle. In some implementations, the vehicle 100 may include a plurality of lidar apparatuses 400.

In the description below, the overall length of the vehicle 100 refers to the length from the front end to the rear end of the vehicle 100, the overall width of the vehicle 100 refers to the width of the vehicle 100, and the overall height of the vehicle 100 refers to the height from the bottom of the wheel to the roof of the vehicle 100. In the following description, the overall length direction L may refer to the reference direction for the measurement of the overall length of the vehicle 100, the overall width direction W may refer to the reference direction for the measurement of the overall width of the vehicle 100, and the overall height direction H may refer to the reference direction for the measurement of the overall height of the vehicle 100.

Figure 1B:
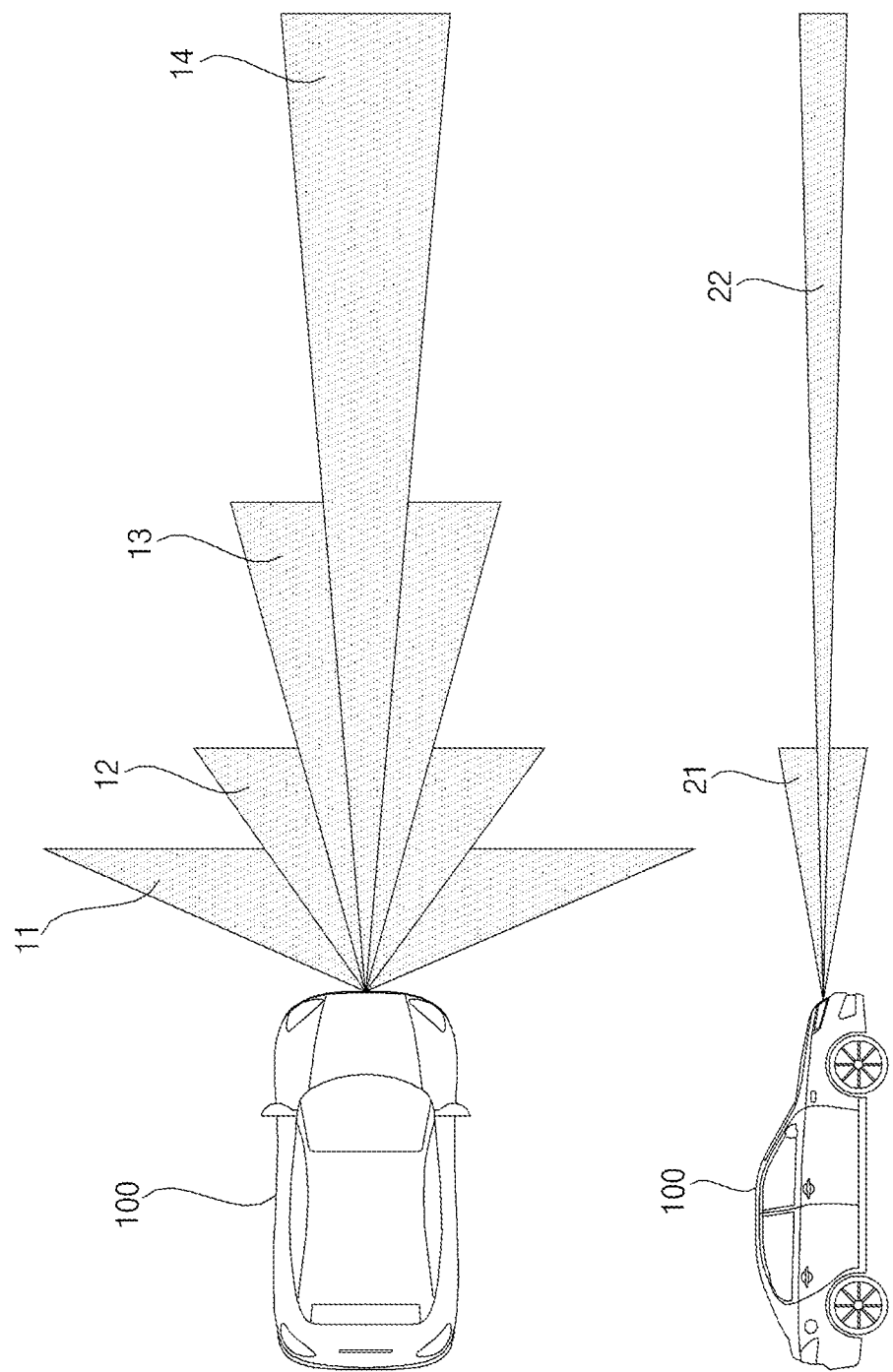
FIGS. 1B and 1C are diagrams illustrating examples of operations of a lidar apparatus for vehicles according to some implementations.
Figure 1C:
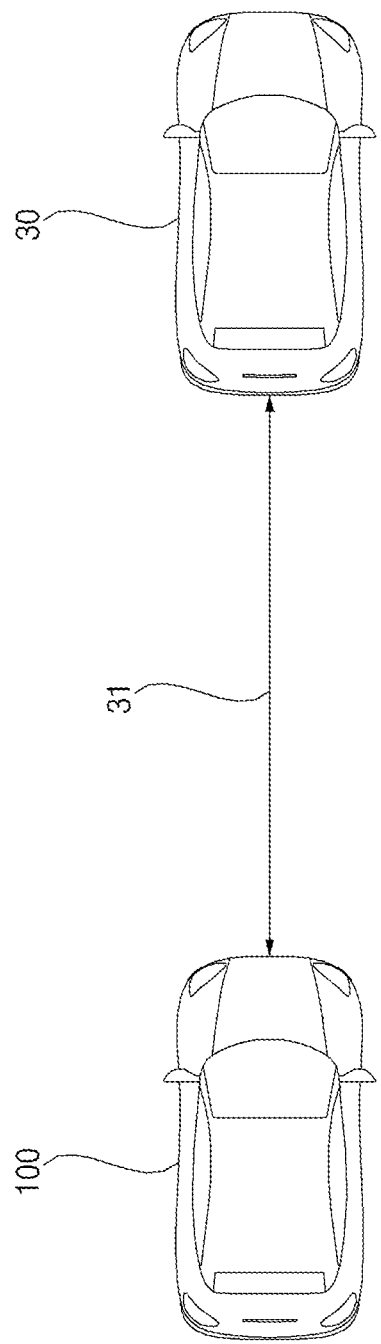

FIGS. 1B and 1C are reference views illustrating operation of a lidar apparatus for vehicles according to some implementations.

The vehicle 100 may include at least one lidar apparatus (e.g., lidar apparatus 400 of FIG. 1A). The lidar apparatus 400 may be mounted to the outside of the vehicle 100, which defines the external appearance of the vehicle 100. For example, the lidar apparatus 400 may be mounted to the front bumper, the radiator grill, the hood, the roof, a door, a side mirror, the tailgate, the trunk lid, or the fender of the vehicle 100.

In some implementations, the vehicle 100 may include a plurality of lidar apparatuses 400. The plurality of lidar apparatuses 400 may detect objects in different directions from the vehicle. For example, the lidar apparatuses 400 may include a first lidar apparatus for detecting an object located in front of the vehicle 100 and a second lidar apparatus for detecting an object located at the rear of the vehicle 100. In some implementations, the lidar apparatuses 400 may further include a third lidar apparatus for detecting an object located at the left side of the vehicle 100 and a fourth lidar apparatus for detecting an object located at the right side of the vehicle 100.

The lidar apparatus 400 may perform optical type beam steering. To this end, the lidar apparatus 400 may include an optical steering unit (e.g., beam steering unit 530 in FIG. 5). The lidar apparatus 400 may control the beam steering unit to perform adaptive beam steering to detect objects in different directions and in different situations. For example, the lidar apparatus 400 may adjust an angle of beam steering of transmission light based on information about travel situations.

Through the use of beam steering, the field of view or the measurement range of the lidar apparatus 400 may be adjusted by adjusting the angle of beam steering of transmission light. For example, in the case where the field of view of the lidar apparatus 400 is increased, the measurement range of the lidar apparatus 400 is decreased. In the case where the field of view of the lidar apparatus 400 is decreased, the measurement range of the lidar apparatus 400 is increased.

Figure 3:
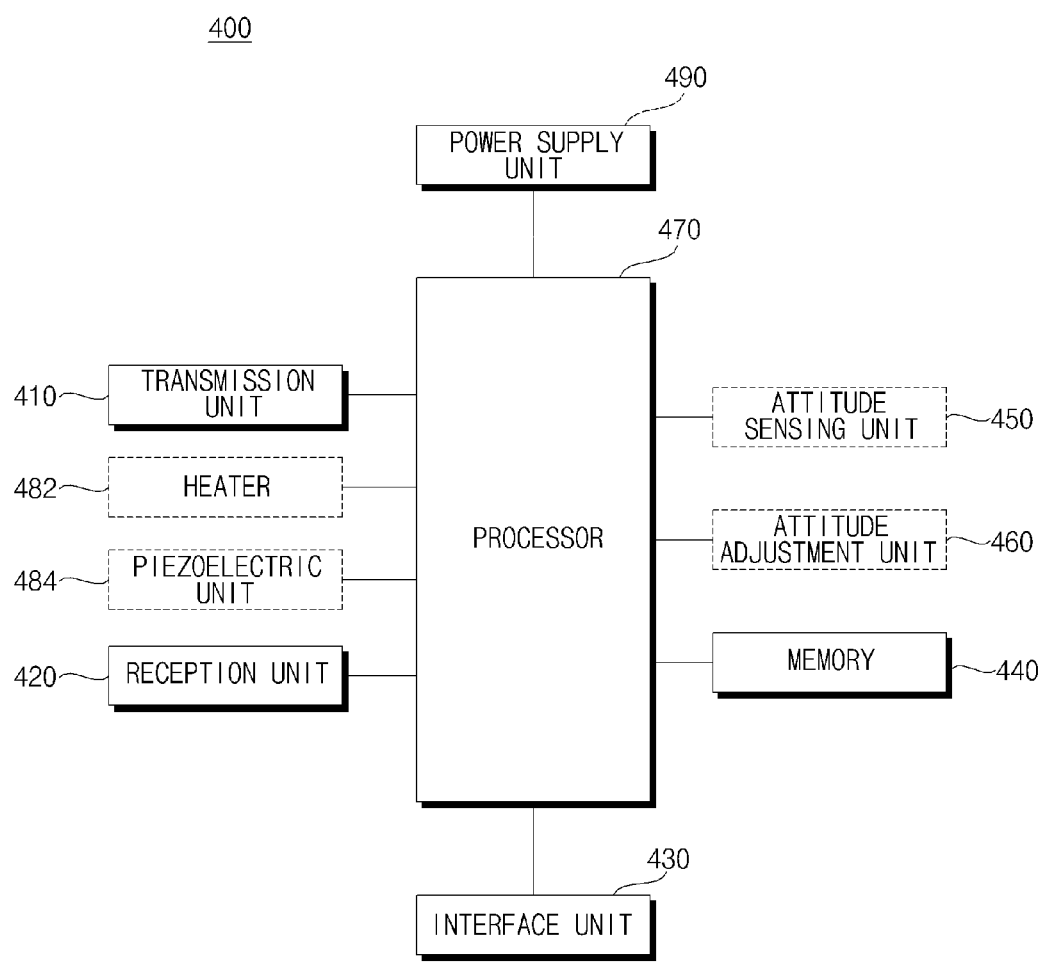
FIG. 3 is a block diagram illustrating an example of a lidar apparatus for vehicles according to some implementations.

As shown in FIG. 1B, the lidar apparatus 400 may set the detection area of an object by adjusting the angle of beam steering of transmission light under the control of at least one processor (e.g., processor 470 in FIG. 3). For example, the processor 470 may adjust the side-to-side angle of beam steering of transmission light in the horizontal direction. In another example, the processor 470 may adjust the up-and-down angle of beam steering of transmission light in the vertical direction.

As such, the lidar apparatus may adaptively control the angle of beam steering to detect different areas around the vehicle. For example, as shown in FIG. 1B, the lidar apparatus 400 may set a first area 11, a second area 12, a third area 13, and a fourth area 14 as the detection area in the horizontal direction under the control of the processor 470. In another example, the lidar apparatus 400 may set a fifth area 21 and a sixth area 22 as the detection area in the vertical direction under the control of the processor 470.

In some implementations, the lidar apparatus 400 may adjust the angle of beam steering of transmission light based on information about travel situations of the vehicle. The information about travel situations may be detected by the lidar apparatus 400, for example. Alternatively or additionally, the information about travel situations may be detected by an inner sensing unit (e.g., inner sensing unit 125 in FIG. 2) or an outer sensing unit (e.g., outer sensing unit 126 in FIG. 2), or may be received from any suitable source of the information.

In some implementations, the processor 470 of the lidar apparatus 400 may set the number of frames per second (FPS) of the lidar apparatus 400 based on the information about travel situations or the set field of view.

In some implementations, the processor 470 of the lidar apparatus 400 may set the resolution of the lidar apparatus 400 based on the information about travel situations or the set field of view.

For example, in a scenario where the vehicle 100 is in a first travel situation, the field of view of the lidar apparatus 400 may be set such that the lidar apparatus 400 has a field of view of 140 degrees in the horizontal direction. In addition, the field of view of the lidar apparatus 400 may be set such that the lidar apparatus 400 has a field of view of 20 degrees in the vertical direction. In this case, the detection distance may be a distance having a radius of 0 m to 30 m from the center of the lidar apparatus 400. In this case, the number of frames per second (FPS) of the lidar apparatus 400 may be set to 20 Hz. In this case, the range resolution of the lidar apparatus 400 may be set to 5 cm to 10 cm.

As another example, in a scenario where the vehicle 100 is in a second travel situation, the field of view of the lidar apparatus 400 may be set such that the lidar apparatus 400 has a field of view of 80 degrees in the horizontal direction. In addition, the field of view of the lidar apparatus 400 may be set such that the lidar apparatus 400 has a field of view of 20 degrees in the vertical direction. In this case, the detection distance may be a distance having a radius of 30 m to 50 m from the center of the lidar apparatus 400. In this case, the number of frames per second (FPS) of the lidar apparatus 400 may be set to 20 Hz. In this case, the range resolution of the lidar apparatus 400 may be set to 10 cm.

As yet another example, in a scenario where the vehicle 100 is in a third travel situation, the field of view of the lidar apparatus 400 may be set such that the lidar apparatus 400 has a field of view of 60 degrees in the horizontal direction. In addition, the field of view of the lidar apparatus 400 may be set such that the lidar apparatus 400 has a field of view of 10 degrees in the vertical direction. In this case, the detection distance may be a distance having a radius of 50 m to 100 m from the center of the lidar apparatus 400. In this case, the number of frames per second (FPS) of the lidar apparatus 400 may be set to 40 Hz. In this case, the range resolution of the lidar apparatus 400 may be set to 10 cm.

As a further example, in a scenario where the vehicle 100 is in a fourth travel situation, the field of view of the lidar apparatus 400 may be set such that the lidar apparatus 400 has a field of view of 30 degrees in the horizontal direction. In addition, the field of view of the lidar apparatus 400 may be set such that the lidar apparatus 400 has a field of view of 10 degrees in the vertical direction. In this case, the detection distance may be a distance having a radius of 100 m to 200 m from the center of the lidar apparatus 400. In this case, the range resolution of the lidar apparatus 400 may be set to 10 cm to 15 cm.

In some implementations, the travel situations of the vehicle may depend on certain properties of the vehicle. For example, the travel situation of the vehicle may correspond to the speed of the vehicle. In this case, a first travel situation may correspond to the speed of the vehicle being less than 30 km/h, a second travel situation may correspond to the speed of the vehicle being equal to or greater than 30 km/h and less than 50 km/h, a third travel situation may correspond to the speed of the vehicle being equal to or greater than 50 km/h and less than 100 km/h, and a fourth travel situation may correspond to the speed of the vehicle being equal to or greater than 100 km/h and less than 200 km/h.

The lidar apparatus 400 may be configured to adjust the angle of beam steering based on various types of information about the vehicle. For example, such information may include information about the attitude of the vehicle, information about the direction of the vehicle, information about the location of the vehicle, information about the angle of the vehicle, information about the acceleration of the vehicle, information about the tilt of the vehicle, information about forward/reverse movement of the vehicle, information about the angle of the steering wheel, information about the pressure applied to an accelerator pedal, or information about the pressure applied to a brake pedal, in addition to the information about the speed of the vehicle, described with reference to FIG. 1B.

As shown in the example of FIG. 1C, the lidar apparatus (e.g., lidar apparatus 400 in FIG. 1A) of vehicle 100 may adjust the angle of beam steering of transmission light based on the distance 31 between the vehicle 100 and an object 30 (e.g., another vehicle). The distance 31 between the vehicle 100 and the object 30 may be one example of information about travel situations of the vehicle 100.

In some implementations, the processor 470 of the lidar apparatus 400 of vehicle 100 may set a frames per second (FPS) of the lidar apparatus 400 based on the information about travel situations or based on the set field of view.

In some implementations, the processor 470 of the lidar apparatus 400 may set the resolution of the lidar apparatus 400 based on the information about travel situations or based on the set field of view.

For example, in the case in which the distance 31 between the vehicle 100 and the object 30 is within a first range, the field of view of the lidar apparatus 400 may be set such that the lidar apparatus 400 has a field of view of 140 degrees in the horizontal direction. In addition, the field of view of the lidar apparatus 400 may be set such that the lidar apparatus 400 has a field of view of 20 degrees in the vertical direction. In this case, the detection distance may be a distance having a radius of 0 m to 30 m from the center of the lidar apparatus 400. In this case, the number of frames per second (FPS) of the lidar apparatus 400 may be set to 20 Hz. In this case, the range resolution of the lidar apparatus 400 may be set to 5 cm to 10 cm.

As another example, in the case in which the distance 31 between the vehicle 100 and the object 30 is within a second range, the field of view of the lidar apparatus 400 may be set such that the lidar apparatus 400 has a field of view of 80 degrees in the horizontal direction. In addition, the field of view of the lidar apparatus 400 may be set such that the lidar apparatus 400 has a field of view of 20 degrees in the vertical direction. In this case, the detection distance may be a distance having a radius of 30 m to 50 m from the center of the lidar apparatus 400. In this case, the number of frames per second (FPS) of the lidar apparatus 400 may be set to 20 Hz. In this case, the range resolution of the lidar apparatus 400 may be set to 10 cm.

As still another example, in the case in which the distance 31 between the vehicle 100 and the object 30 is within a third range, the field of view of the lidar apparatus 400 may be set such that the lidar apparatus 400 has a field of view of 60 degrees in the horizontal direction. In addition, the field of view of the lidar apparatus 400 may be set such that the lidar apparatus 400 has a field of view of 10 degrees in the vertical direction. In this case, the detection distance may be a distance having a radius of 50 m to 100 m from the center of the lidar apparatus 400. In this case, the number of frames per second (FPS) of the lidar apparatus 400 may be set to 40 Hz. In this case, the range resolution of the lidar apparatus 400 may be set to 10 cm.

As a further example, in the case in which the distance 31 between the vehicle 100 and the object 30 is within a fourth range, the field of view of the lidar apparatus 400 may be set such that the lidar apparatus 400 has a field of view of 30 degrees in the horizontal direction. In addition, the field of view of the lidar apparatus 400 may be set such that the lidar apparatus 400 has a field of view of 10 degrees in the vertical direction. In this case, the detection distance may be a distance having a radius of 100 m to 200 m from the center of the lidar apparatus 400. In this case, the range resolution of the lidar apparatus 400 may be set to 10 cm to 15 cm.

In some implementations, the lidar apparatus 400 may adjust the angle of beam steering based on other properties of object 30, such as the speed of the vehicle 100 relative to the object 30 or based on the location of the object 30, in addition to the distance 31 between the vehicle 100 and the object 30.

The object 30 may be any suitable object outside the vehicle, such as a lane on the road, a nearby vehicle, a pedestrian, a light, a traffic signal, a road, a structure, a bump, a geographical feature, an animal, etc.

Figure 2:
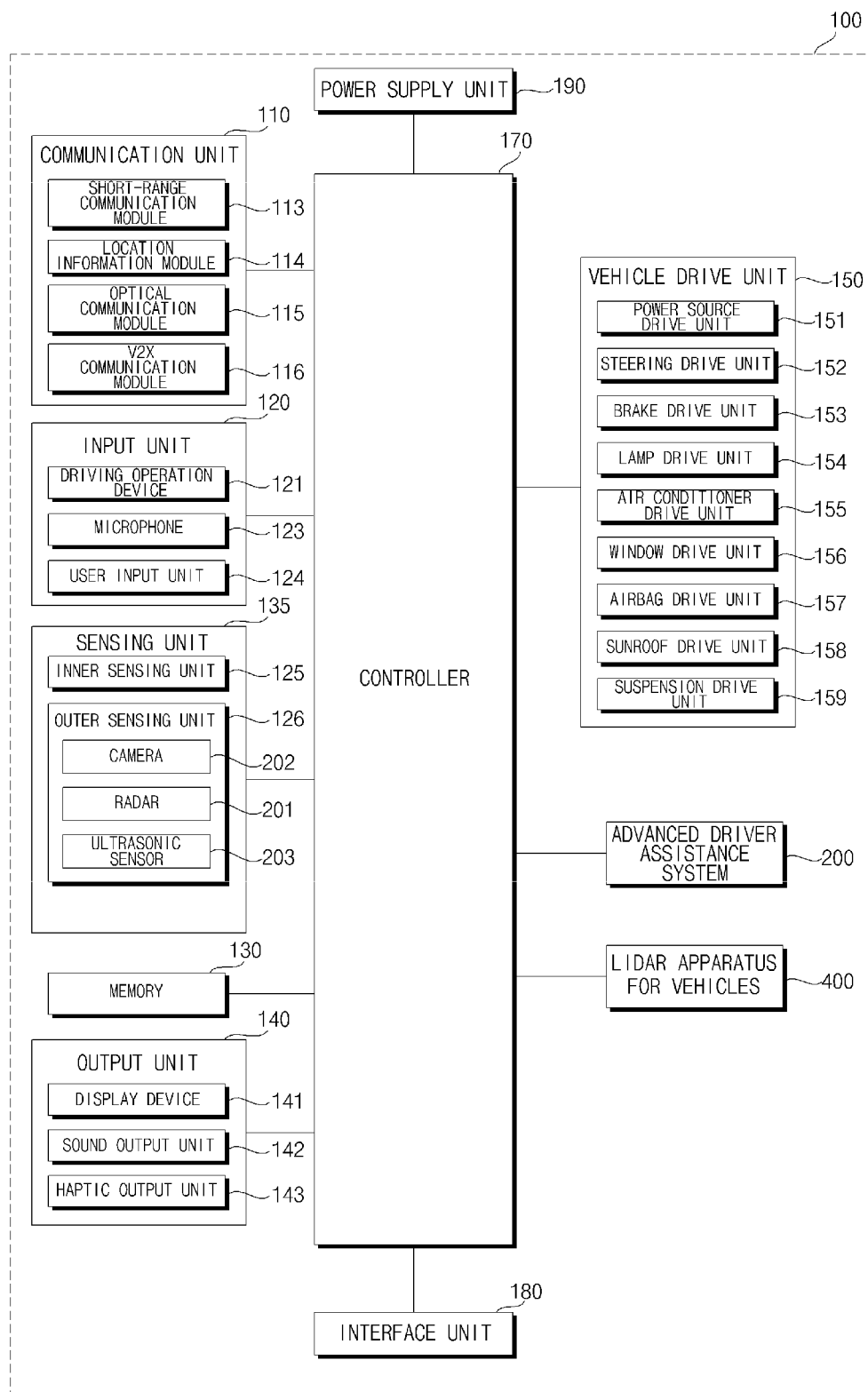
FIG. 2 is a block diagram illustrating an example of a vehicle according to some implementations.

FIG. 2 is a reference block diagram illustrating an example of the vehicle according to some implementations.

Referring to FIG. 2, the vehicle 100 may include a communication unit 110, an input unit 120, a sensing unit 135, a memory 130, an output unit 140, a vehicle drive unit 150, a controller 170, an interface unit 180, a power supply unit 190, an advanced driver assistance system 200, and a lidar apparatus 400.

The communication unit 110 may include a short-range communication module 113, a location information module 114, an optical communication module 115, and a V2X communication module 116.

The communication unit 110 may include one or more Radio Frequency (RF) circuits or elements in order to perform communication with other devices.

The short-range communication module 113 may support short-range communication using at least one selected from among Bluetooth™, Radio Frequency Identification (RFID), Infrared Data Association (IrDA), Ultra-WideBand (UWB), ZigBee, Near Field Communication (NFC), Wireless-Fidelity (Wi-Fi), Wi-Fi Direct, and Wireless USB (Wireless Universal Serial Bus).

The short-range communication module 113 may form wireless area networks to perform short-range communication between the vehicle 100 and at least one external device. For example, the short-range communication module 113 may exchange data with a mobile terminal of a passenger in a wireless manner. The short-range communication module 113 may receive weather information and road traffic state information (e.g. Transport Protocol Expert Group (TPEG) information) from the mobile terminal. When a user gets into the vehicle 100, the mobile terminal of the user and the vehicle 100 may pair with each other automatically or as the result of the user executing a pairing application.

The location information module 114 is a module for acquiring the location of the vehicle 100. A representative example of the location information module 114 includes a Global Positioning System (GPS) module. For example, when the vehicle 100 utilizes the GPS module, the location of the vehicle 100 may be acquired using signals transmitted from GPS satellites.

In some implementations, the location information module 114 may be a component included in the sensing unit 135, rather than a component included in the communication unit 110.

The optical communication module 115 may include a light emitting unit and a light receiving unit.

The light receiving unit may convert light into electrical signals so as to receive information. The light receiving unit may include Photodiodes (PDs) for receiving light. The photo diodes may convert light into electrical signals. For example, the light receiving unit may receive information regarding a preceding vehicle from light emitted from a light source included in the preceding vehicle.

The light emitting unit may include at least one light emitting element for converting electrical signals into light. Here, the light emitting element may be a Light Emitting Diode (LED) or a Laser Diode (LD). The light emitting unit converts electrical signals into light to thereby emit the light. For example, the light emitting unit may externally emit light by flashing the light emitting element at a predetermined frequency. In some implementations, the light emitting unit may include an array of light emitting elements. In some implementations, the light emitting unit may be integrated with a lamp provided in the vehicle 100. For example, the light emitting unit may be at least one selected from among a headlight, a taillight, a brake light, a turn signal light, and a sidelight. For example, the optical communication module 115 may exchange data with another vehicle through optical communication.

The V2X communication module 116 is a module for performing wireless communication with a server or another vehicle. The V2X communication module 116 includes a module capable of supporting a protocol for communication between vehicles (V2V) or communication between a vehicle and some infrastructure (V2I). The vehicle 100 may perform wireless communication with an external server or another vehicle via the V2X communication module 116.

The input unit 120 may include a driving operation device 121, a microphone 123, and a user input unit 124.

The driving operation device 121 receives a user input for driving of the vehicle 100. The driving operation device 121 may include a steering input device, a shift input device, an acceleration input device, and a brake input device.

The steering input device receives a user input with regard to the direction of travel of the vehicle 100. The steering input device may take the form of a wheel to enable a steering input through the rotation thereof. In some implementations, the steering input device may be configured as a touchscreen, a touch pad, or a button.

The shift input device receives an input for selecting one of Park (P), Drive (D), Neutral (N), and Reverse (R) gears of the vehicle 100 from the user. The shift input device may take the form of a lever. In some implementations, the shift input device may be configured as a touchscreen, a touch pad, or a button.

The acceleration input device receives a user input for acceleration of the vehicle 100.

The brake input device receives a user input for deceleration of the vehicle 100. Each of the acceleration input device and the brake input device may take the form of a pedal. In some implementations, the acceleration input device or the brake input device may be configured as a touchscreen, a touch pad, or a button.

The microphone 123 may process external sound signals into electrical data. The processed data may be utilized in various ways in accordance with the function that the vehicle 100 is performing. The microphone 123 may convert a user voice command into electrical data. The converted electrical data may be transmitted to the controller 170.

In some implementations, the microphone 123 may be a component included in the sensing unit 135, rather than a component included in the input unit 120.

The user input unit 124 is configured to receive information from the user. When information is input through the user input unit 124, the controller 170 may control the operation of the vehicle 100 according to the input information. The user input unit 124 may include a touch input unit or a mechanical input unit. In some implementations, the user input unit 124 may be located in the region of the steering wheel. In this case, the driver may operate the user input unit 124 with the fingers while gripping the steering wheel.

The sensing unit 135 may sense the state of the vehicle 100 or the situation outside the vehicle 100. The sensing unit 135 may include an inner sensing unit 125 and an outer sensing unit 126.

The inner sensing unit 125 senses the state of the vehicle 100. The inner sensing unit 125 may include an attitude sensor (for example, a yaw sensor, a roll sensor, or a pitch sensor), a collision sensor, a wheel sensor, a speed sensor, a gradient sensor, a weight sensor, a heading sensor, a yaw sensor, a gyro sensor, a position module, a vehicle forward/reverse movement sensor, a battery sensor, a fuel sensor, a tire sensor, a steering sensor based on the rotation of the steering wheel, an in-vehicle temperature sensor, an in-vehicle humidity sensor, an ultrasonic sensor, an illumination sensor, an accelerator pedal position sensor, and a brake pedal position sensor.

The inner sensing unit 125 may acquire sensing signals with regard to, for example, vehicle attitude information, vehicle collision information, vehicle driving direction information, vehicle location information (GPS information), vehicle angle information, vehicle speed information, vehicle acceleration information, vehicle tilt information, vehicle forward/reverse movement information, battery information, fuel information, tire information, vehicle lamp information, in-vehicle temperature information, in-vehicle humidity information, steering-wheel rotation angle information, out-of-vehicle illumination information, information about the pressure applied to an accelerator pedal, and information about the pressure applied to a brake pedal.

The inner sensing unit 125 may further include, for example, an accelerator pedal sensor, a pressure sensor, an engine speed sensor, an Air Flow-rate Sensor (AFS), an Air Temperature Sensor (ATS), a Water Temperature Sensor (WTS), a Throttle Position Sensor (TPS), a Top Dead Center (TDC) sensor, and a Crank Angle Sensor (CAS).

The outer sensing unit 126 may sense the situation outside the vehicle 100. The outer sensing unit 126 may sense an object located outside the vehicle. Here, the object may include a lane, a nearby vehicle, a pedestrian, a light, a traffic signal, a road, a structure, a bump, a geographical feature, and an animal.

The lane may be the lane in which the vehicle 100 is traveling or the lane next to the lane in which the vehicle 100 is traveling. The lane may include left and right lines that define the lane.

The nearby vehicle may be a vehicle that is traveling in the vicinity of the vehicle 100. The nearby vehicle may be a vehicle spaced apart from the vehicle 100 by a predetermined distance or less. The nearby vehicle may be a preceding vehicle or a following vehicle. The nearby vehicle may be a vehicle that is traveling in the lane next to the lane in which the vehicle 100 is traveling. The nearby vehicle may be a vehicle that is traveling in the direction intersecting the direction in which the vehicle 100 is traveling at an intersection.

The pedestrian may be a person on a sidewalk or on the roadway.

The light may be light generated by a lamp provided in the nearby vehicle. The light may be light generated by a streetlight. The light may be solar light.

The traffic signal may include a traffic signal lamp, a traffic sign, and a pattern or text painted on a road surface.

The road may include a road surface, a curve, and slopes, such as an upward slope and a downward slope.

The structure may be a body located around the road in the state of being fixed to the ground. For example, the structure may include a streetlight, a roadside tree, a building, and a signal lamp.

The geographical feature may include a mountain and a hill.

The object may be classified as a movable object or a stationary object. For example, a movable object may include a nearby vehicle or a pedestrian, etc. A stationary object may include a traffic signal, a road, or a structure, etc.

The outer sensing unit 126 may include a camera 202, a radar 201, and/or an ultrasonic sensor 203, to name a few examples.

The camera 202 may be a camera device for vehicles. The camera 202 may include a mono camera and/or a stereo camera.

The camera 202 may be located at an appropriate position outside the vehicle in order to acquire images of the outside of the vehicle.

For example, the camera 202 may be disposed near a front windshield 10 in the vehicle in order to acquire images of the front of the vehicle. Alternatively, the camera 202 may be disposed around a front bumper or a radiator grill.

For example, the camera 202 may be disposed near a rear glass in the vehicle in order to acquire images of the rear of the vehicle. Alternatively, the camera 202 may be disposed around a rear bumper, a trunk, or a tailgate.

For example, the camera 202 may be disposed near at least one of the side windows in the vehicle in order to acquire images of the side of the vehicle. Alternatively, the camera 202 may be disposed around a side mirror, a fender, or a door.

The radar 201 may include an electromagnetic wave transmission unit, an electromagnetic wave reception unit, and a processor. The radar 201 may be realized as a pulse radar or a continuous wave radar depending on the principle of emission of an electric wave. In addition, the continuous wave radar may be realized as a Frequency Modulated Continuous Wave (FMCW) type radar or a Frequency Shift Keying (FSK) type radar depending on the waveform of a signal.

The radar 201 may detect an object based on a transmitted electromagnetic wave, and may detect the distance to the detected object and the speed relative to the detected object.

The radar 201 may provide the acquired information about the object to the controller 170, the advanced driver assistance system 200, or an illumination device for vehicles. Here, the information about the object may include information about the distance to the object.

The radar 201 may be located at an appropriate position outside the vehicle in order to sense an object located in front of the vehicle, an object located to the rear of the vehicle, or an object located to the side of the vehicle.

The ultrasonic sensor 203 may include an ultrasonic wave transmission unit, an ultrasonic wave reception unit, and a processor.

The ultrasonic sensor 203 may detect an object based on a transmitted ultrasonic wave, and may detect the distance to the detected object and the speed relative to the detected object.

The ultrasonic sensor 203 may provide the acquired information about the object to the controller 170, the advanced driver assistance system 200, or the illumination device for vehicles. Here, the information about the object may include information about the distance to the object.

The ultrasonic sensor 203 may be located at an appropriate position outside the vehicle in order to sense an object located in front of the vehicle, an object located to the rear of the vehicle, or an object located to the side of the vehicle.

In some implementations, the lidar apparatus 400 may be arranged as a sub-component of the outer sensing unit 126.

The memory 130 is electrically connected to at least one processor, such as controller 170. The memory 130 may store basic data for each unit, control data for the operational control of each unit, and input/output data. The memory 130 may be any of various hardware storage devices, such as a ROM, a RAM, an EPROM, a flash drive, and a hard drive. The memory 130 may store various data for the overall operation of the vehicle 100, such as programs for the processing or control of the controller 170.

The output unit 140 is configured to output information processed in the controller 170. The output unit 140 may include a display device 141, a sound output unit 142, and a haptic output unit 143.

The display device 141 may display various graphic objects. For example, the display device 141 may display vehicle-associated information. Here, the vehicle-associated information may include vehicle control information for the direct control of the vehicle or driver assistance information to guide the driver in driving the vehicle. In addition, the vehicle associated information may include vehicle state information indicating the current state of the vehicle or vehicle traveling information regarding the traveling of the vehicle.

The display device 141 may include at least one selected from among a Liquid Crystal Display (LCD), a Thin Film Transistor LCD (TFT LCD), an Organic Light Emitting Diode (OLED), a flexible display, a three-dimensional display (3D display), and an e-ink display.

The display device 141 may form an inter-layer structure together with a touch sensor, or may be integrally formed with the touch sensor to implement a touchscreen. The touchscreen may function as the user input unit 124, which provides an input interface between the vehicle 100 and the user, and may also function to provide an output interface between the vehicle 100 and the user. In this case, the display device 141 may include a touch sensor for sensing a touch on the display device 141 so as to receive a control command in a touch manner. When a touch is input to the display device 141 as described above, the touch sensor may sense the touch, and the controller 170 may generate a control command corresponding to the touch. The content input in a touch manner may be characters or numbers, or may be, for example, instructions in various modes or menu items that may be designated.

The display device 141 may include a cluster for allowing the driver to check vehicle state information or vehicle traveling information while driving the vehicle. The cluster may be located on a dashboard. In this case, the driver may check information displayed on the cluster while looking forward.

In some implementations, the display device 141 may be implemented as a Head Up display (HUD). When the display device 141 is implemented as a HUD, information may be output through a transparent display provided on the front windshield 10. Alternatively, the display device 141 may include a projector module in order to output information through an image projected on the front windshield 10.

In some implementations, the display device 141 may include a transparent display. In this case, the transparent display may be attached to the front windshield 10.

The transparent display may display a predetermined screen with a predetermined transparency. In order to achieve the transparency, the transparent display may include at least one selected from among a transparent Thin Film Electroluminescent (TFEL) display, an Organic Light Emitting Diode (OLED) display, a transparent Liquid Crystal Display (LCD), a transmissive transparent display, and a transparent LED display. The transparency of the transparent display may be adjustable.

In some implementations, the display device 141 may function as a navigation device.

The sound output unit 142 converts electrical signals from the controller 170 into audio signals and outputs the audio signals. To this end, the sound output unit 142 may include, for example, a speaker. The sound output unit 142 may output sound corresponding to the operation of the user input unit 124.

The haptic output unit 143 generates a tactile output. For example, the haptic output unit 143 may operate to vibrate a steering wheel, a safety belt, or a seat so as to allow the user to recognize the output thereof.

The vehicle drive unit 150 may control the operation of various devices of the vehicle. The vehicle drive unit 150 may include a power source drive unit 151, a steering drive unit 152, a brake drive unit 153, a lamp drive unit 154, an air conditioner drive unit 155, a window drive unit 156, an airbag drive unit 157, a sunroof drive unit 158, and a suspension drive unit 159.

The power source drive unit 151 may perform electronic control of a power source inside the vehicle 100.

For example, in the case in which a fossil fuel-based engine is the power source, the power source drive unit 151 may perform electronic control of the engine. As such, the power source drive unit 151 may control, for example, the output torque of the engine. In the case in which the power source drive unit 151 is such an engine, the power source drive unit 151 may limit the speed of the vehicle by controlling the output torque of the engine under the control of the controller 170.

In another example, when an electric motor is the power source, the power source drive unit 151 may perform control of the motor. As such, the power source drive unit 151 may control, for example, the RPM and torque of the motor.

The steering drive unit 152 may perform electronic control of a steering apparatus inside the vehicle 100. As such, the steering drive unit 152 may change the direction of travel of the vehicle 100.

The brake drive unit 153 may perform electronic control for a brake apparatus inside the vehicle 100. For example, the brake drive unit 153 may reduce the speed of the vehicle 100 by controlling the operation of brakes located at wheels. In another example, the brake drive unit 153 may adjust the direction of travel of the vehicle 100 leftward or rightward by differently operating respective brakes located at left and right wheels.

The lamp drive unit 154 may turn at least one lamp, arranged inside or outside the vehicle, on or off. In addition, the lamp drive unit 154 may control, for example, the intensity and radiation direction of the light from the lamp. For example, the lamp drive unit 154 may perform control for a turn-signal lamp or a brake lamp.

The air conditioner drive unit 155 may perform electronic control of an air conditioner inside the vehicle 100. For example, when the interior temperature of the vehicle is high, the air conditioner drive unit 155 may operate the air conditioner so as to supply cool air to the interior of the vehicle.

The window drive unit 156 may perform electronic control of a window apparatus inside the vehicle 100. For example, the window drive unit 156 may control the opening or closing of left and right windows of the vehicle.

The airbag drive unit 157 may perform electronic control of an airbag apparatus inside the vehicle 100. For example, the airbag drive unit 157 may perform control such that an airbag is deployed in a dangerous situation.

The sunroof drive unit 158 may perform electronic control of a sunroof apparatus inside the vehicle 100. For example, the sunroof drive unit 158 may control the opening or closing of a sunroof.

The suspension drive unit 159 may perform electronic control of a suspension apparatus inside the vehicle 100. For example, when the road surface is uneven, the suspension drive unit 159 may control the suspension apparatus in order to reduce the vibration of the vehicle 100.

In some implementations, the vehicle drive unit 150 may include a chassis drive unit. Here, the chassis drive unit may include the steering drive unit 152, the brake drive unit 153, and the suspension drive unit 159.

The controller 170 may control the overall operation of each unit inside the vehicle 100. The controller 170 may be referred to as an Electronic Control Unit (ECU).

The controller 170 may be implemented in a hardware manner using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

The interface unit 180 may serve as a passage for various kinds of external devices that are connected to the vehicle 100. For example, the interface unit 180 may have a port that is connectable to a mobile terminal and may be connected to the mobile terminal via the port. In this case, the interface unit 180 may exchange data with the mobile terminal.

The interface unit 180 may serve as a passage for the supply of electrical energy to a mobile terminal connected thereto. When the mobile terminal is electrically connected to the interface unit 180, the interface unit 180 may provide electrical energy, supplied from the power supply unit 190, to the mobile terminal under the control of the controller 170.

The power supply unit 190 may supply power required to operate the respective components under the control of the controller 170. In particular, the power supply unit 190 may receive power from, for example, a battery inside the vehicle 100.

The advanced driver assistance system 200 may assist a driver in driving the vehicle. The advanced driver assistance system 200 may include the lidar apparatus 400.

The lidar apparatus 400 may detect an object located outside the vehicle 100.

The lidar apparatus 400 may detect an object based on the time of flight (TOF) or the phase difference between a transmission signal and a reception signal through the medium of light.

The lidar apparatus 400 may detect the distance to the object, the speed relative to the object, and the location of the object.

FIG. 3 is a reference block diagram illustrating an example of a lidar apparatus for vehicles according to some implementations.

Referring to FIG. 3, the lidar apparatus 400 may include a transmission unit 410, a reception unit 420, a memory 440, an interface unit 430, at least one processor 470, and a power supply unit 490. In some implementation, at least one of the above-mentioned components of the lidar apparatus 400 may be omitted, or the lidar apparatus 400 may further include at least one additional component.

The transmission unit 410 may generate and output a transmission signal. The transmission unit 410 may be controlled by at least one processor 470.

The transmission unit 410 may output a transmission signal in the form of light. In this case, the transmission unit 410 may include an optical generation unit 417 (see FIG. 4). The optical generation unit 417 may convert an electrical signal into light. For example, the optical generation unit 417 may include a laser generation unit. In this case, a transmission signal may be realized as an optical signal.

For example, the transmission unit 410 may output a transmission signal in the form of a Frequency Modulated Continuous Wave (FMCW). That is, the transmission signal may be realized in the form of an FMCW.

The transmission unit 410 may perform beam steering of the light generated by the optical generation unit 417. For example, the transmission unit 410 may change the path of the light generated by the optical generation unit 417 in order to perform beam steering of the light.

The transmission unit 410 may perform scanning through the steered light.

Figure 5:
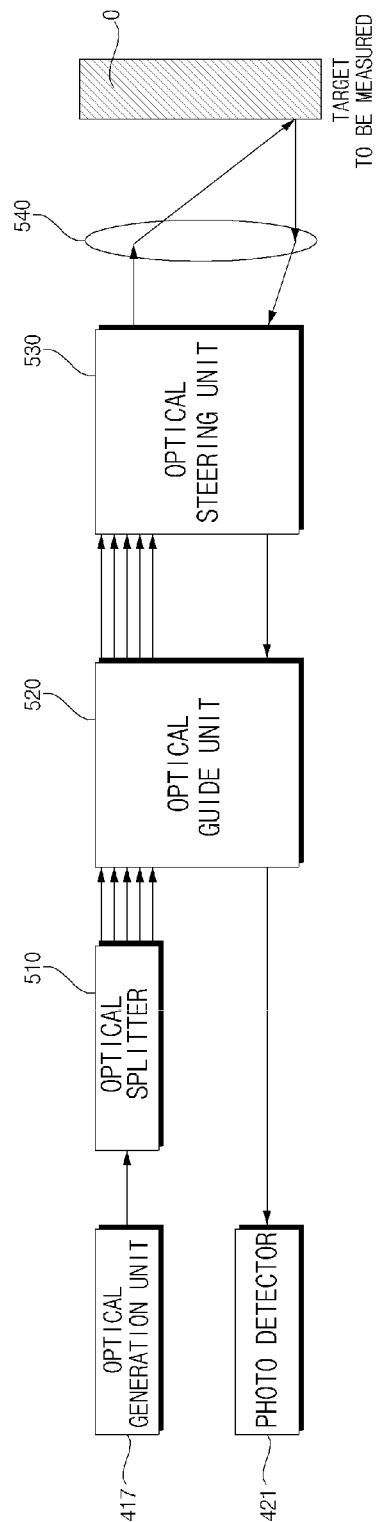
FIG. 5 is a block diagram illustrating an example of operations of transmission light and reception light according to some implementations.

The transmission unit 410 may include an optical generation unit (e.g., 417 in FIG. 5), an optical splitter (e.g., 510 in FIG. 5), an optical guide unit (e.g., 520 in FIG. 5), and an optical steering unit (e.g., 530 in FIG. 5).

The optical generation unit 417 may generate light corresponding to a transmission signal, and may output the optical signal to the outside. The optical generation unit 417 may generate transmission light, and may output the generated transmission light to the outside.

The light generated by the optical generation unit 417 may be a laser.

In optical splitter (e.g., optical splitter 510 in FIG. 5) may split the transmission light generated by the optical generation unit 417 into a plurality of beams.

An optical guide unit (e.g., optical guide unit 520 in FIG. 5) may guide the plurality of beams split by the optical splitter towards an optical steering unit (e.g., optical steering unit 530 in FIG. 5).

The optical steering unit 530 may perform beam steering of the light generated by the optical generation unit 417. For example, the optical steering unit 530 may continuously change the path of light introduced thereinto. In some implementations, the optical steering unit 530 may perform a scanning-type detection by changing the direction of steering of light.

Two different implementations of the optical steering unit 530 will be described further below with reference to FIGS. 10A-10B and FIGS. 11A-11C. These two implementations utilize different hardware and different techniques to achieve the general feature of adaptively steering one or more beams.

Figure 10A:
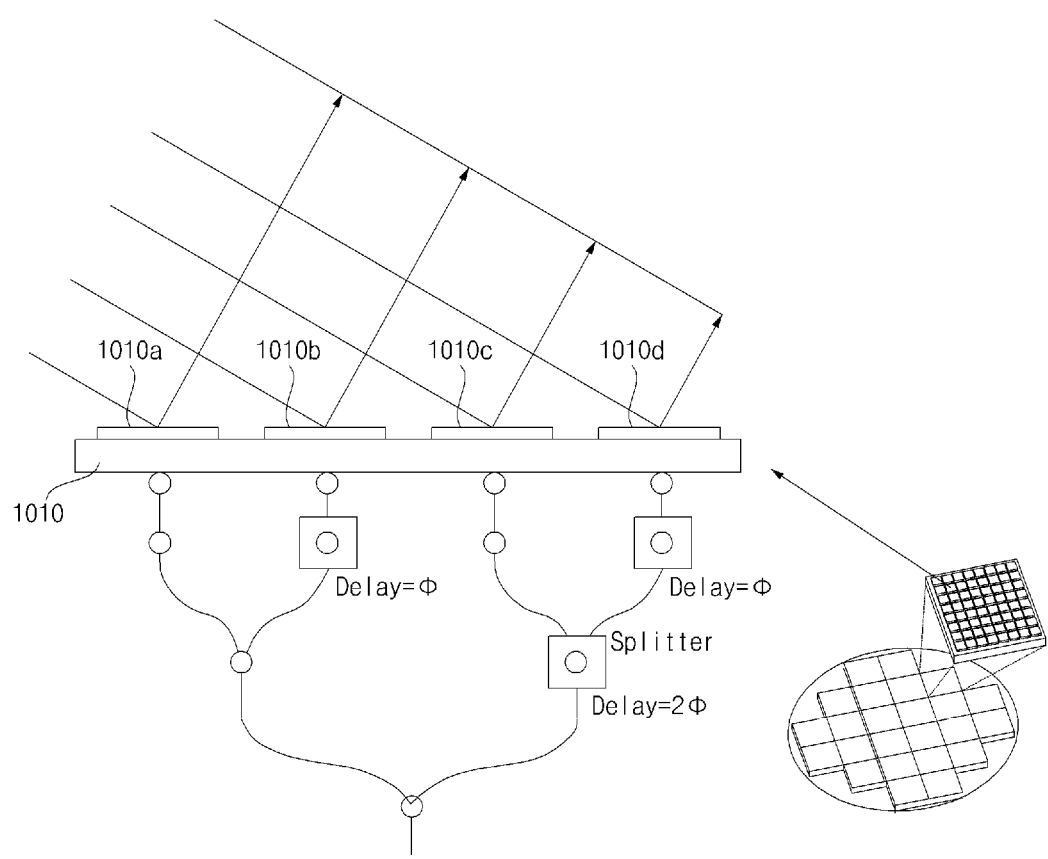
FIGS. 10A and 10B are diagrams illustrating examples of an optical steering unit according to an implementation.
Figure 10B:
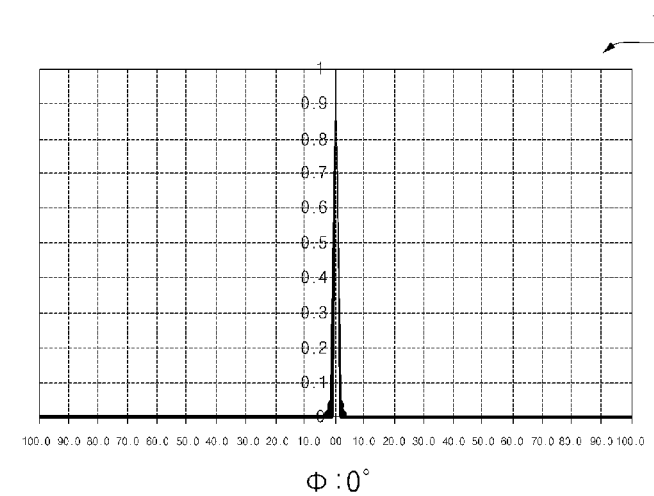
Figure 10B:
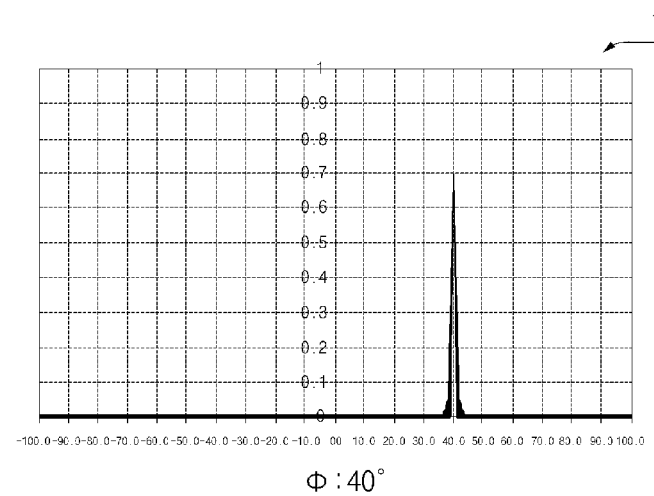
Figure 10B:
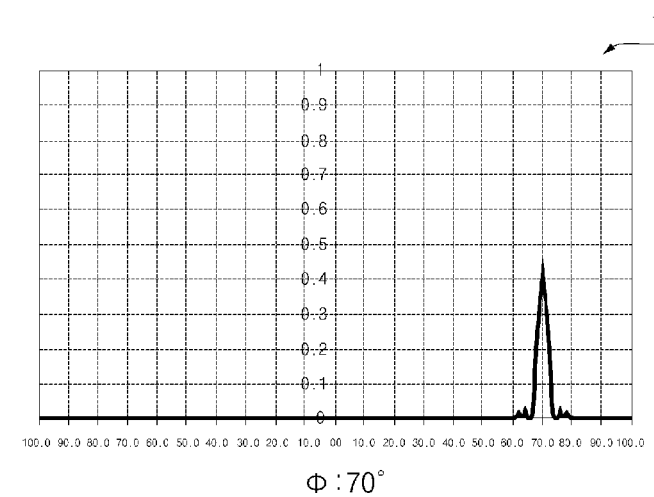

The implementation of FIGS. 10A and 10B provides an optical steering unit 530 that includes an optical phased array, which may have a plurality of individual arrays. As such, the plurality of individual arrays in the optical phased array of optical steering unit 520 may receive the plurality of beams that were split by optical splitter 510 and that have different phases.

Figure 11A:
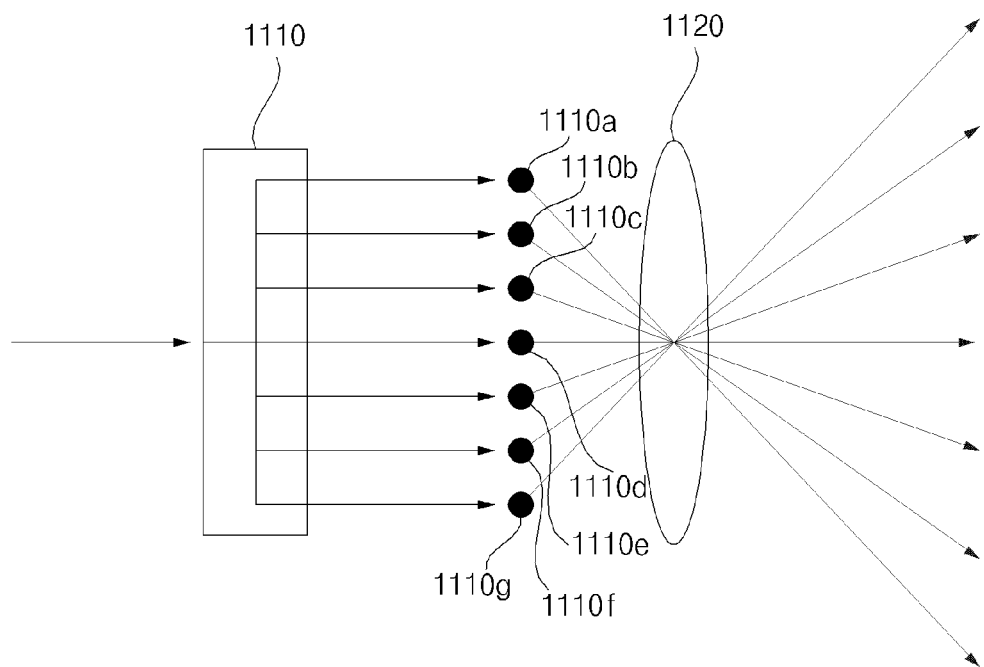
FIGS. 11A to 11C are diagrams illustrating an optical steering unit according to another implementation.
Figure 11B:
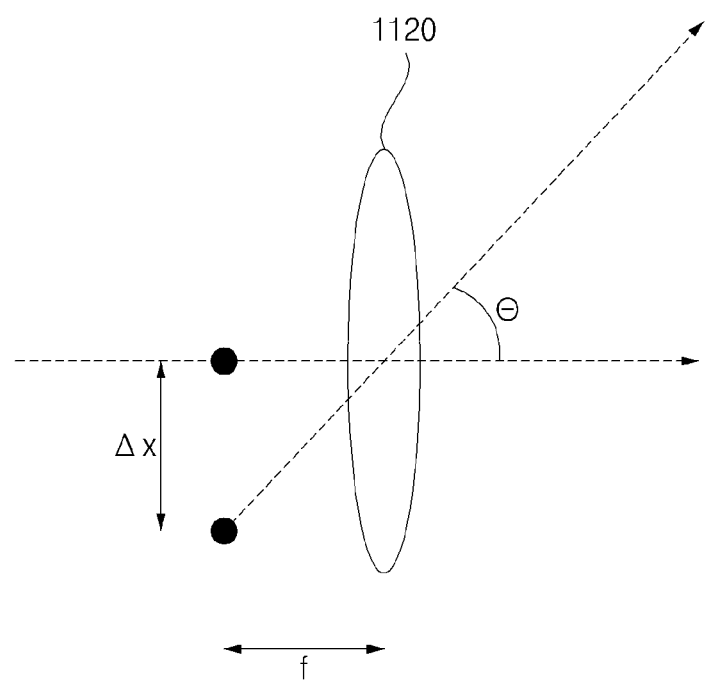
Figure 11C:
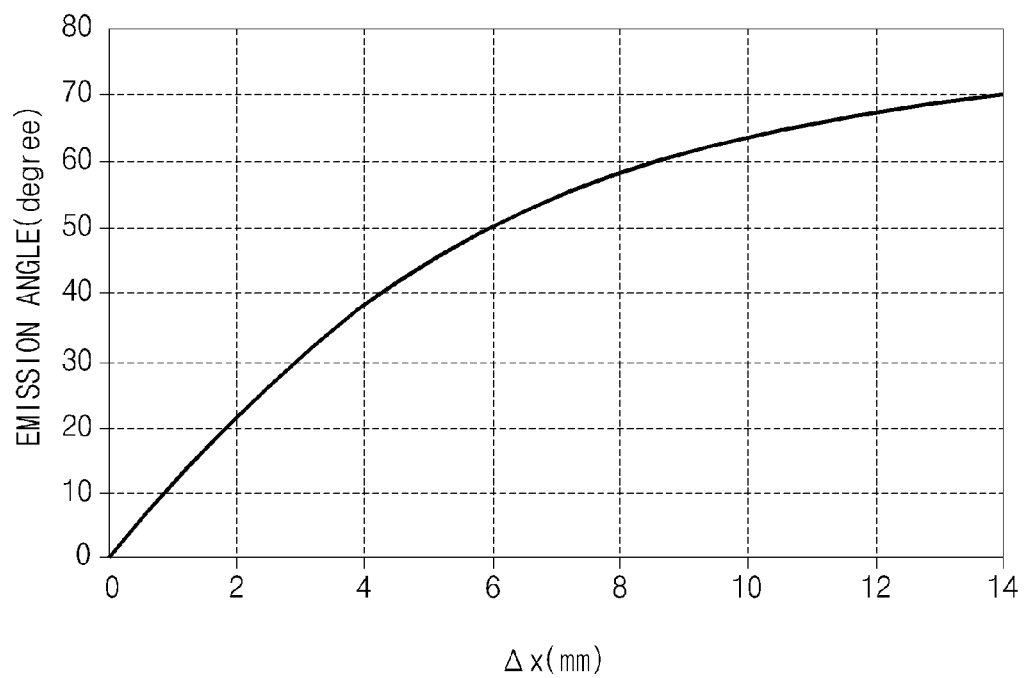

The implementation of FIGS. 11A to 11C provides an optical steering unit 530 that includes an optical switch. The optical switch may be controlled to change the emission angle of the transmission light to adjust the angle of the beam steering.

In some implementations, the transmission unit 410 may include an optical coupler in place of the optical splitter 510 (see FIG. 5). The optical coupler may perform light division and light combination.

The reception unit 420 may acquire a reception signal. Here, the reception signal is a signal formed as the result of the transmission signal being reflected by an object. The reception unit 420 may be controlled by at least one processor 470.

The reception unit 420 may acquire reflection light, which is formed as the result of the transmission signal being reflected by the object.

In the case in which an FMCW signal is output as a transmission signal, the reception unit 420 may acquire a reception signal as an FMCW signal.

Figure 4:
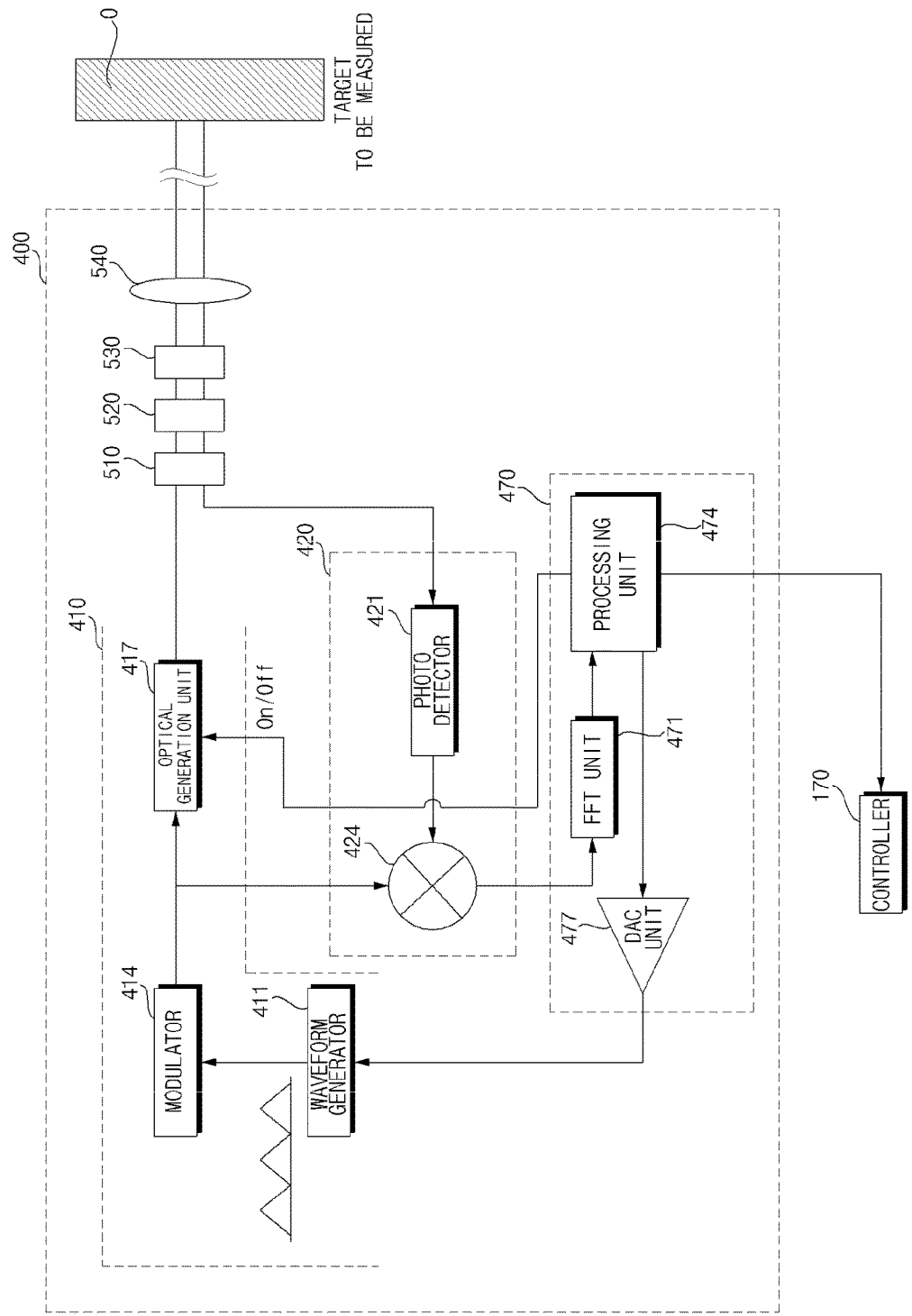
FIG. 4 is a block diagram illustrating details of an example of a vehicle lidar apparatus that detects an object through the medium of light.

In the case in which an object is detected through the medium of an optical signal, the reception unit 420 may include a photo detector 421 (see FIG. 4). The photo detector 421 may convert light into electricity. For example, the photo detector 421 may include a photo diode (PD).

The reception unit 420 may include a photo diode (PD) array. In this case, one photo diode may form one pixel. The processor 470 may generate an image based on information sensed by the respective photo diodes of the photo diode array.

The reception unit 420 may receive light reflected from respective points of the transmission light that is scanned. For example, when transmission light is output toward a first point, the reception unit 420 may receive light reflected from the first point. In addition, when transmission light is output toward a second point, the reception unit 420 may receive light reflected from the second point. In this way, the reception unit 420 may continuously receive light reflected from a plurality of points in order to sense the reflection light from each point. Each point may be defined as one pixel. The processor 470 may generate an image based on the information sensed at each point.

The memory 440 may store various kinds of data for the overall operation of the lidar apparatus 400, such as programs for the processing or control of the processor 470. The memory 440 may be any one of various hardware storage devices, such as a ROM, a RAM, an EPROM, a flash drive, and a hard drive.

The interface unit 430 may function as a path for allowing the lidar apparatus 400 to exchange data with a device connected to the lidar apparatus 400 therethrough. The interface unit 430 may receive data from a unit that is electrically connected to the lidar apparatus 400, and may transmit a signal processed or generated by the processor 470 to the unit that is electrically connected to the lidar apparatus 400. The interface unit 430 may function as a path for allowing the lidar apparatus 400 to exchange data with a controller of the advanced driver assistance system 200 or with the controller 170 of the vehicle 100 therethrough.

The interface unit 430 may receive information or data from the controller of the advanced driver assistance system 200. For example, the interface unit 430 may receive information about an expected collision time from the controller of the advanced driver assistance system 200. For example, the interface unit 430 may receive information about the distance to an object from the controller of the advanced driver assistance system 200.

The interface unit 430 may transmit signals, data, or information to the other devices in the vehicle 100.

For example, the interface unit 430 may provide signals, data, or information generated by the processor 470 to another object sensing device in the vehicle 100.

The interface unit 430 may receive information about travel situations from the inner sensing unit 125 (see FIG. 2) or the outer sensing unit 126 (see FIG. 2) of the vehicle 100.

The information about travel situations may include at least one selected from between information sensed in the vehicle and information sensed outside the vehicle. The information sensed in the vehicle may be information sensed and generated by the inner sensing unit 125. The information sensed outside the vehicle may be information sensed and generated by the outer sensing unit 126.

The processor 470 may be electrically connected to the respective units in the lidar apparatus 400 so as to control the overall operation of the respective units.

The processor 470 may compare a reflection signal with a transmission signal to acquire information about an object. For example, the processor 470 may compare reflection light with transmission light to acquire information about an object.

For example, the processor 470 may calculate the time of flight (TOF) or the phase shift between the transmission light and the reflection light in order to acquire information about an object.

Information about an object may include information about whether an object is present or not, information about the distance to an object, information about the speed relative to an object, and information about the location of an object.

The processor 470 may generate an image of the object based on the transmission light and the reception light. Specifically, the processor 470 may compare transmission light with reception light corresponding to each pixel to generate an image of the object. For example, the processor 470 may compare transmission light with reception light corresponding to each pixel to calculate the TOF or the phase shift for each pixel, thereby generating an image of the object.

The processor 470 may receive information about travel situations from the inner sensing unit 125 or the outer sensing unit 126 through the interface unit 430.

The information about travel situations may include at least one selected from between information sensed in the vehicle and information sensed outside the vehicle.

The information sensed in the vehicle may be information sensed and generated by the inner sensing unit 125. For example, the information sensed in the vehicle may include at least one selected from among vehicle attitude information, vehicle driving direction information, vehicle location information, vehicle angle information, vehicle speed information, vehicle acceleration information, vehicle tilt information, vehicle forward/reverse movement information, steering-wheel rotation angle information, information about the pressure applied to an accelerator pedal, and information about the pressure applied to a brake pedal.

The information sensed outside the vehicle may be information sensed and generated by the outer sensing unit 126. For example, the information sensed outside the vehicle may include information about an object located outside the vehicle. Such information about an object may include information about whether an object is present or not, information about the distance to an object, information about the speed relative to an object, and information about the location of an object.

The object may be any suitable object outside the vehicle, such as a lane in the road, a nearby vehicle, a pedestrian, a light, a traffic signal, a road, a structure, a bump, a geographical feature, an animal, etc.

Information about travel situations may be information about an object located in the vicinity of the vehicle. Here, the information about the object may be information generated by the processor 470 based on reflection light.

The processor 470 may generate the information about the object based on the reflection light, and may adjust the angle of the beam steering of the transmission light based on the generated information about the object.

The processor 470 may adjust the angle of the beam steering of the transmission light based on the information about travel situations.

The processor 470 may adjust the field of view (FOV) of the transmission light by adjusting the angle of the beam steering of the transmission light.

The processor 470 may set the detection area of the object by adjusting the angle of the beam steering of the transmission light.

For example, the processor 470 may adjust the side-to-side angle of beam steering of the transmission light in the horizontal direction. The processor 470 may adjust the up-and-down angle of beam steering of the transmission light in the vertical direction.

The processor 470 may control a heater 482 so as to change the individual phases of beams split by the optical splitter 510.

The processor 470 may control a piezoelectric unit 484 so as to change the individual phases of beams split by the optical splitter 510.

The processor 470 may generate a depth map based on the transmission light and the reflection light. Specifically, the processor 470 may compare transmission light and reflection light corresponding to each pixel to calculate the TOF or the phase shift for each pixel, thereby generating a depth map.

The processor 470 may determine whether a disturbance has occurred based on the depth value of a predetermined region of interest (ROI) on the depth map. Specifically, the processor 470 may accumulate the depth value of the region of interest, and may store the accumulated depth values in the memory 440. The processor 470 may determine whether a disturbance has occurred based on the difference between the average value of the accumulatively stored depth values and a newly acquired depth value of the region of interest.

The processor 470 may be implemented using at least one selected from among Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electric units for the implementation of other functions.

In some implementations, the lidar apparatus 400 may selectively further include one or both of the heater 482 and the piezoelectric unit 484.

The heater 482 may provide heat to the optical guide unit 520 (see FIGS. 4 and 5).

The heater 482 may include an element for converting electrical energy into thermal energy. For example, the heater 482 may convert electrical energy into thermal energy using a Peltier effect, and may provide heat to the optical guide unit 520.

When the heater 482 provides heat to the optical guide unit 520, the phase of light guided by the optical guide unit 520 may be changed. The lidar apparatus 400 may perform beam steering using such phase-changed light.

The heater 482 may be operated under the control of the processor 470.

The piezoelectric unit 484 may provide pressure to the optical guide unit 520 (see FIGS. 4 and 5).

The piezoelectric unit 484 may include a piezoelectric element. For example, the piezoelectric unit 484 may provide pressure to the optical guide unit 520 using a piezoelectric effect.

When the piezoelectric unit 484 provides pressure to the optical guide unit 520, the phase of light guided by the optical guide unit 520 may be changed. The lidar apparatus 400 may perform beam steering using such changed phase of light.

The piezoelectric unit 484 may be operated under the control of the processor 470.

In some implementations, the lidar apparatus 400 may further include an attitude sensing unit 450 and an attitude adjustment unit 460.

The attitude sensing unit 450 may sense the attitude of the lidar apparatus 400. In order to transmit a transmission signal toward an object located in front of the vehicle, an object located at the rear of the vehicle, or an object located at the side of the vehicle, and to acquire a reception signal reflected by the object, the lidar apparatus 400 must take an appropriate attitude. In the case in which the attitude of the lidar apparatus 400 is changed due to the application of external impact to the vehicle, the attitude sensing unit 450 may sense the change in attitude of the lidar apparatus 400.

In order to sense the attitude of the lidar apparatus 400, the attitude sensing unit 450 may include at least one selected from among an infrared sensor, a bolt fastening sensor (for example, a bolt magnet sensor), and a gyro sensor.

The attitude adjustment unit 460 may adjust the attitude of the lidar apparatus 400 based on the results of sensing by the attitude sensing unit 450. The attitude adjustment unit 460 may include a driving means, such as a motor. The attitude adjustment unit 460 may adjust the attitude of the lidar apparatus 400 under the control of the processor 470 such that the lidar apparatus 400 can appropriately transmit a transmission signal and appropriately acquire a reception signal.

The processor 470 may receive information about the attitude of the lidar apparatus 400 sensed by the attitude sensing unit 450. The processor 470 may control the attitude adjustment unit 460 based on the received information about the attitude of the lidar apparatus 400.

In some implementations, the processor 470 may control the direction and magnitude of a beam in a transmission signal in the state in which the attitude of the lidar apparatus 400 is maintained.

In the case in which the attitude of the lidar apparatus 400, sensed by the attitude sensing unit 450, is changed, the processor 470 may provide relevant information to the controller 170 through the interface unit 430. In this case, the controller 170 may output information about the change in attitude of the lidar apparatus 400 through the output unit 140 such that a user can notice the change in attitude of the lidar apparatus 400.

FIG. 4 is a detailed reference block diagram illustrating an example of the lidar apparatus for vehicles according to some implementations, which detects an object through the medium of light.

Referring to FIG. 4, the transmission unit 410 may include a waveform generator 411, a modulator 414, and an optical generation unit 417.

The waveform generator 411 may generate a transmission signal. To this end, the waveform generator 411 may include an oscillating element, such as a Voltage Controlled Oscillator (VCO). Alternatively, in some implementations, the waveform generator 411 may include a plurality of oscillators.

For example, the waveform generator 411 may generate an FMCW signal. The FMCW signal will be described next with reference to FIG. 7.

Figure 7:
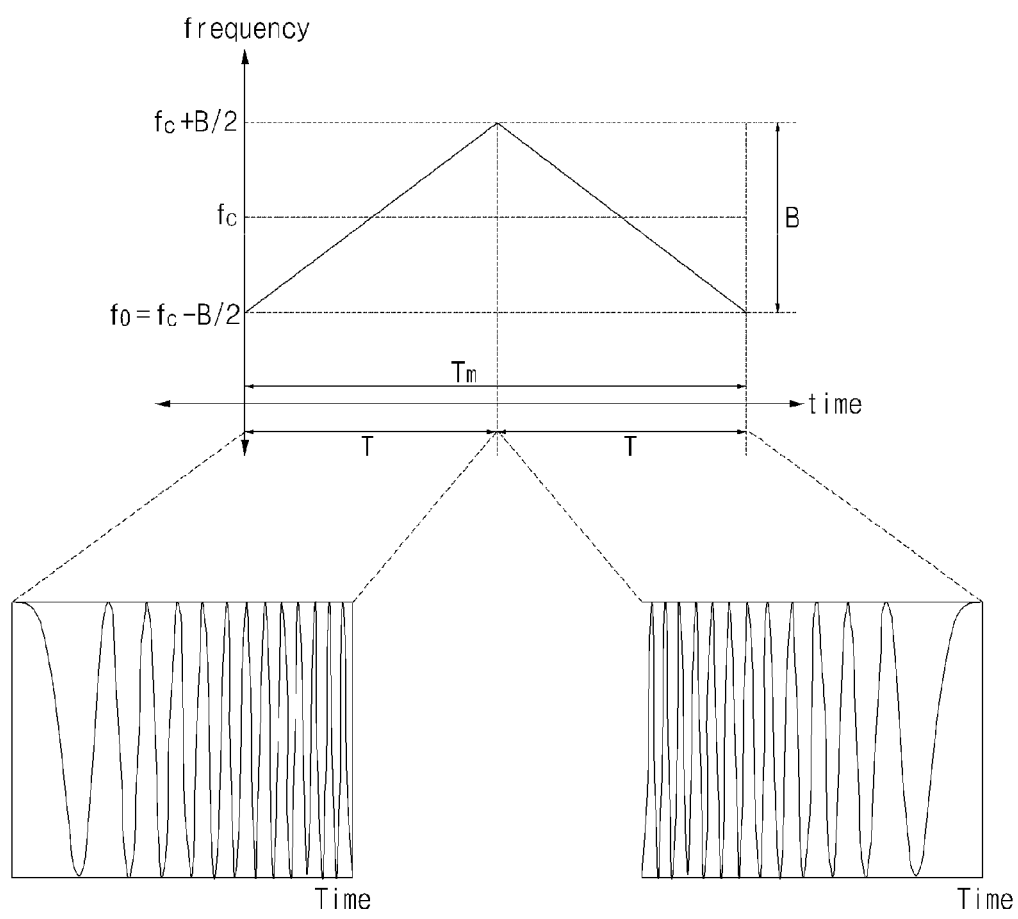
FIG. 7 is a diagram illustrating an example of implementing a Frequency Modulated Continuous Wave (FMCW) signal.

FIG. 7 is a reference view illustrating an example of an FMCW signal according to some implementations.

Referring to the example of FIG. 7, the waveform generator 411 may generate a triangle wave-shaped frequency-modulated continuous wave (FMCW) signal. The transmission unit 410 may output a transmission signal that corresponds to the FMCW signal. The transmission signal that is output may reflect off an object and generate reflection that is received as a reception signal. The lidar apparatus 400 may compare the transmission signal and the reception signal to determine information about a distance to the object.

As an example, the lidar apparatus 400 may analyze the spectrum of the frequency of a beat signal (hereinafter, referred to as a beat frequency) that is acquired from a reception signal and a transmission signal (for example, a time domain signal indicating the difference in frequency between a reception signal and a transmission signal) in order to acquire information about the distance to an object and information about the speed of the object. In FIG. 7, $f_c$ indicates a center frequency, $f_0$ indicates a start frequency, B indicates a modulation bandwidth, and $T_m$ indicates a modulation period.

An FMCW signal may be classified as an up-chirp signal or a down-chirp signal.

Referring back to FIG. 4, the modulator 414 may be configured to modulate a carrier with a transmission signal generated by the waveform generator 411. The carrier may be, for example, light that is generated by the optical generation unit 417. For example, the modulator 414 may modulate an FMCW signal onto the carrier light.

As such, the optical generation unit 417 may generate light corresponding to the transmission signal, and may output an optical signal to the outside. For example, if the optical generation unit 417 outputs light corresponding to the FMCW signal, then the transmission light may be realized as the FMCW signal.

The light generated by the optical generation unit 417 may, in some implementations, be a laser.

In some implementations, the transmission unit 410 may further include an amplifier. The amplifier may include an amplification circuit. The amplifier may amplify a signal generated by the waveform generator 411, and may provide the amplified signal to the modulator 414.

The reception unit 420, which receives the reflected light, may include a photo detector 421 and a mixer 424.

The photo detector 421 may convert reception light into an electrical signal. The photo detector 421 may receive a reflection light signal formed as the result of an optical signal output by the transmission unit 410 being reflected by an object, and may convert the received reflection light signal into an electrical signal.

The mixer 424 may correlatively calculate a signal generated by the waveform generator 411 and a signal received by the photo detector 421, and may output the difference between the two signals.

For example, the mixer 424 may generate information about a TOF corresponding to the time difference between a transmission signal output by the transmission unit 410 and a reception signal received by the reception unit 420.

In another example, the mixer 424 may mix a transmission signal generated by the waveform generator 411 and a reception signal received by the photo detector 421, and may generate a signal corresponding to the difference in frequency between the transmission signal and the reception signal.

The frequency of a signal acquired from the transmission signal and the reception signal may be referred to as a beat frequency. The frequency output from the mixer 424 may be a beat frequency.

The processor 470 may acquire information about the object based on the difference in frequency between the transmission signal and the reception signal.

The reception unit 420 may further include a filter and an amplifier.

The filter may filter a signal generated by the mixer 424.

The amplifier may amplify a signal that is generated by the mixer 424 or a signal that is generated by the mixer 424 and filtered by the filter, and may provide the amplified signal to the processor 470.

The processor 470 may include a Fast Fourier Transform (FFT) unit 471, a processing unit 474, and a Digital to Analog Converter (DAC) unit 477.

In the case in which a transmission signal and a reception signal are FMCW signals, the FFT unit 471 may measure the frequency of a signal output from the mixer 424 through fast Fourier transform. The FFT unit 471 may generate information about phase shift through fast Fourier transform of a signal corresponding to the difference in frequency between the transmission signal and the reception signal.

In some implementations, the FFT unit 471 may be omitted.

The processing unit 474 may acquire information about an object. The processing unit 474 may acquire information about an object based on the difference between the transmission signal and the reception signal, which is provided by the mixer 424.

The processing unit 474 may acquire information about an object based on TOF or phase shift.

The processing unit 474 may acquire information about an object based on information about TOF provided by the mixer 424.

The processing unit 474 may acquire information about an object based on information about a phase shift (PS).

Information about an object may include information about whether or not an object is present, information about the distance to an object, information about the speed relative to an object, and information about the location of an object.

Hereinafter, the operation of acquiring object information in the case in which a transmission signal and a reception signal are FMCW signals will be described with reference to FIGS. 8A to 8C.

Figure 8A:
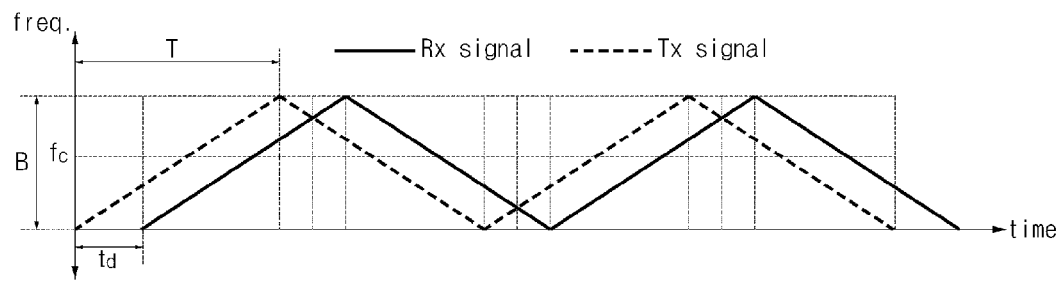
FIGS. 8A to 8C are diagrams illustrating examples of implementing a transmission frequency and a reception frequency.
Figure 8B:
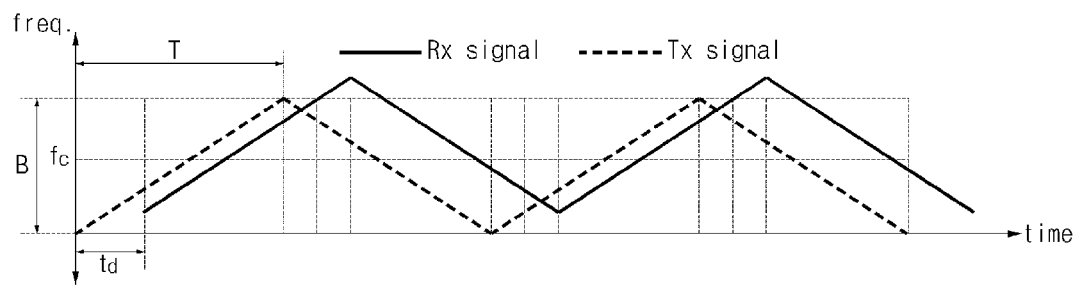
Figure 8C:
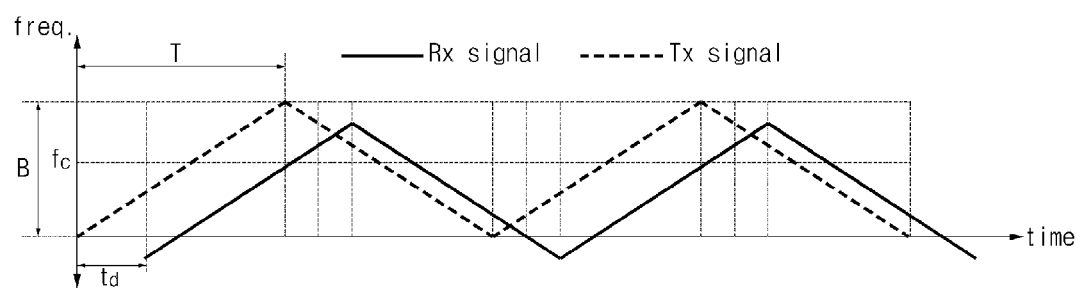

FIGS. 8A to 8C are views showing examples of a transmission frequency and a reception frequency according to some implementations.

Figure 9A:
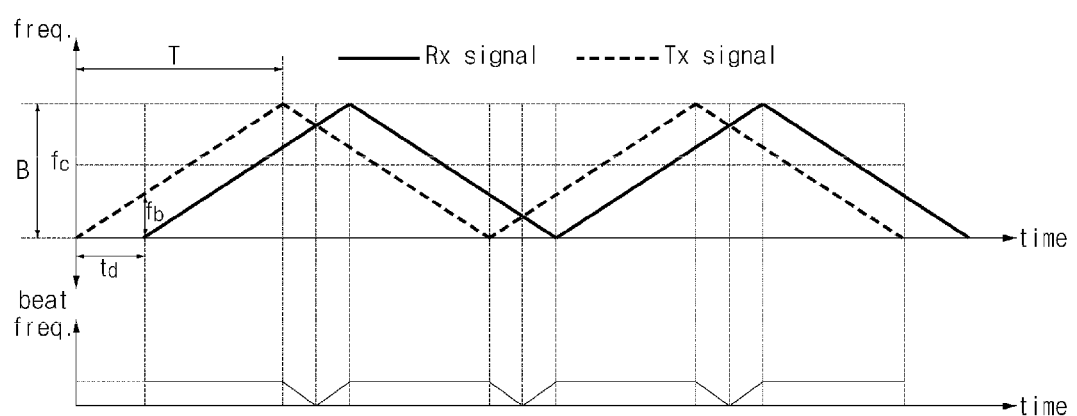
FIGS. 9A and 9B are diagrams illustrating examples of implementing a beat frequency.
Figure 9B:
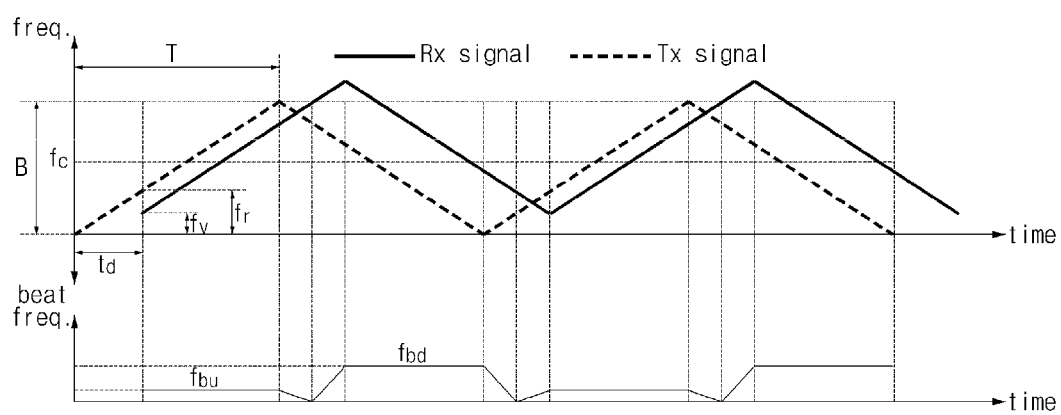

FIGS. 9A and 9B are reference views illustrating examples of a beat frequency according to some implementations.

The operation of acquiring object information will be described with reference to FIGS. 8A to 9B.

FIGS. 8A to 8C are views showing the relationship between the frequency of a transmission signal (hereinafter, referred to as a transmission frequency) and the frequency of a reception signal (hereinafter, referred to as a reception frequency) on a time axis. FIG. 8A shows the case in which an object is stationary, FIG. 8B shows the case in which an object approaches the lidar apparatus, and FIG. 8C shows the case in which an object becomes distant from the lidar apparatus.

In FIGS. 8A to 8C, $t_d$ indicates a delay time between a transmission signal and a reception signal, which is set based on the distance between an object and the lidar apparatus.

FIGS. 9A and 9B are views showing the relationship between the frequency of a transmission signal and the frequency of a reception signal and a beat frequency acquired therefrom on a time axis. FIG. 9A shows the same static situation as in FIG. 8A, and FIG. 9B shows the same dynamic situation as in FIG. 8B. The beat frequency $f_b$ is the difference between the transmission frequency and the reception frequency.

In the static situation shown in FIG. 9A, the beat frequency may be set based on a delay time due to the distance between the object and the lidar apparatus.

In the dynamic situation shown in FIG. 9B, the relative speed between the object and the lidar apparatus is changed, with the result that a Doppler frequency shift phenomenon occurs. Consequently, the beat frequency is a combination of a range beat frequency $f_r$ and a Doppler frequency $f_d$.

The beat frequency includes an up-beat frequency, which corresponds to an up chirp, and a down-beat frequency, which corresponds to a down chirp.

The up-beat frequency and the down-beat frequency each include a frequency shift component caused due to the distance to a target that is moving and the speed relative to the target. These components are referred to as a range beat frequency and a Doppler frequency.

The up-beat frequency may be expressed as the sum of the range beat frequency and the Doppler frequency, and the down-beat frequency may be expressed as the difference between the range beat frequency and the Doppler frequency.

A Doppler frequency having a negative value may correspond to a scenario in which the object is approaching the lidar apparatus 400, and a Doppler frequency having a positive value may correspond to a scenario in which the object is moving away from the lidar apparatus 400.

The processing unit 474 of the processor 470 may calculate the distance to the object and the speed relative to the object based on the range beat frequency and the Doppler frequency.

Referring back to FIG. 4, the DAC unit 477 may be configured to convert a digital signal into an analog signal. The converted analog signal may be input to the waveform generator 411.

In some implementations, the lidar apparatus 400 may further include an optical splitter 510, an optical guide unit 520, an optical steering unit 530, and a lens 540.

The optical splitter 510 may be configured to split transmission light into a plurality of split beams.

The optical guide unit 520 may be disposed between the optical generation unit 417 and the optical steering unit 530. The optical guide unit 520 may guide the transmission light, output by the optical generation unit 417, to the optical steering unit 530.

The optical guide unit 520 may include a core, made of silicon nitride ($Si_3N_4$) and silicon dioxide ($SiO_2$), having a cladding structure.

The optical guide unit 520 may include a plurality of cores. Each of the cores may be made of, for example, silicon nitride ($Si_3N_4$) and silicon dioxide ($SiO_2$), and may have a cladding structure.

The optical guide unit 520 may guide the plurality of beams that are split by the optical splitter 510 towards the optical steering unit 530 through the cores of the optical guide unit 520.

The optical guide unit 520 may guide the reflection light towards the photo detector 421.

The optical steering unit 530 may steer transmission light. The optical steering unit 530 may perform beam steering by outputting light, the optical phase of which has been changed by the heater 482 or the piezoelectric unit 484.

The lens 540 may change the path of light steered by the optical steering unit 530. The lens 540 may set the field of view (FOV) of the lidar apparatus 400 based on the refractive index thereof.

FIG. 5 is a reference block diagram illustrating transmission light and reception light according to some implementations.

Referring to FIG. 5, laser light that is generated by the optical generation unit 417 may be input into the optical splitter 510.

The optical splitter 510 may split the laser light into a plurality of beams. The split beams of the laser light may be guided by the optical guide unit 520, and may be input into the optical steering unit 530.

In some implementations, the optical splitter 510 may change the phases of the split beams of the laser light. The phase-changed beams of the laser light may be provided to the optical steering unit 530.

The optical guide unit 520 may include a plurality of cores. Each of the cores may be made of silicon nitride ($Si_3N_4$) and silicon dioxide ($SiO_2$), and may have a cladding structure.

The heater 482 (see FIG. 3) may provide heat to the optical guide unit 520. The optical phases of the beams guided by the optical guide unit 520 may be changed by the heat provided from the heater 482. For example, the refractive index of the optical guide unit 520 may be changed by the heat provided from the heater 482, and the optical phases of the beams guided by the optical guide unit 520 may be changed by the changed refractive index of the optical guide unit 520.

The processor 470 may control the heater 482 such that the optical phases of the beams guided by the optical guide unit 520 are changed.

In some implementations, a piezoelectric unit (e.g., piezoelectric unit 484 of FIG. 3) may apply pressure to the optical guide unit 520. The optical phases of the beams guided by the optical guide unit 520 may be changed by the pressure applied from the piezoelectric unit 484. For example, the refractive index of the optical guide unit 520 may be changed by the pressure applied from the piezoelectric unit 484, and the optical phases of the beams guided by the optical guide unit 520 may be changed by the changed refractive index of the optical guide unit 520.

The processor 470 may control the piezoelectric unit 484 such that the optical phases of the beams guided by the optical guide unit 520 are changed.

In some implementations, the optical phases of the beams may be changed differently. The optical phase-changed beams may be introduced into the optical steering unit 530. The optical steering unit 530 may condense the beams introduced thereinto. If the beams have different optical phases, then the condensed beams may be differently steered based on the respective optical phases of the beams.

The light steered by the optical steering unit 530 may be output to the lens 540.

The light passes through the lens 540, is output, and is then reflected by an object O. The light reflected by the object O may be introduced into the photo detector 421 via the optical steering unit 530 and the optical guide unit 520.

The processor 470 may steer the light output from the optical steering unit 530 through the heater 482 or the piezoelectric unit 484.

Figure 6A:
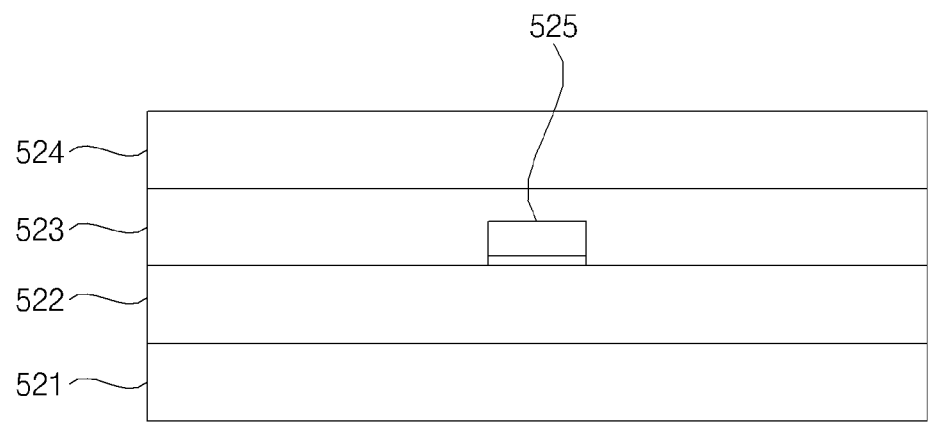
FIG. 6A is a diagram illustrating an example of an optical guide unit according to some implementations.

FIG. 6A is a reference view illustrating an optical guide unit according to some implementations. FIG. 6B is a reference view illustrating some effects and features of the optical guide unit according to some implementations.

FIG. 6A shows an example in which the optical guide unit 520 includes a single core 525. Alternatively, the optical guide unit 520 may include a plurality of cores, as previously described.

Referring to FIG. 6A, the optical guide unit 520 may include a substrate 521, a first silicon dioxide layer 522 formed on the substrate 521, a second silicon dioxide layer 523 formed on the first silicon dioxide layer 522, a core 525 formed in the second silicon dioxide layer 523, and a third silicon dioxide layer 524 formed on the second silicon dioxide layer 523.

The substrate 521 may be a silicon substrate, as an example.

The first silicon dioxide layer 522 may be a thermal silicon dioxide ($SiO_2$) layer.

The second silicon dioxide layer 523 may be a low pressure chemical vapor deposition (LPCVD) silicon dioxide ($SiO_2$) layer.

The core 525 may be formed in the second silicon dioxide layer 523. The core 525 may be made of silicon nitride ($Si_3N_4$) and silicon dioxide ($SiO_2$), and may have a cladding structure.

The third silicon dioxide layer 524 may be a plasma enhanced chemical vapor deposition (PECVD) silicon dioxide (SiO₂) layer.

FIG. 6B shows examples of experimental results with respect to the bending radius, attenuation, applicable beam wavelength, and fiber-chip coupling when the core is made of various kinds of materials.

Referring to FIG. 6B, in the case in which the core 525 (see FIG. 6A) is made of silicon nitride ($Si_3N_4$) and silicon dioxide ($SiO_2$) and has a cladding structure, the bending radius of the core 525 may be 0.05 mm. The smaller the bending radius of the core 525 is, the more the optical guide unit may be miniaturized and integrated. In the case in which the core 525 is made of silicon nitride ($Si_3N_4$) and silicon dioxide ($SiO_2$) and has a cladding structure, the core 525 may be miniaturized and integrated more than cores made of other different materials.

In the case in which the core 525 is made of silicon nitride ($Si_3N_4$) and silicon dioxide ($SiO_2$) and has a cladding structure, the loss ratio of the core 525 per unit length (cm) is 0.05 dB, which is lower than the loss ratios of cores made of other different materials. Since the loss ratio of the core 525 is low in the case in which the core 525 is made of silicon nitride ($Si_3N_4$) and silicon dioxide ($SiO_2$) and has a cladding structure, the optical generation unit may be configured using a light source having a small output. In addition, the core 525 may have high energy efficiency.

In the case in which the core 525 is made of silicon nitride ($Si_3N_4$) and silicon dioxide ($SiO_2$) and has a cladding structure, light ranging from visible light to infrared light may be used as transmission light. Visible light from the lidar apparatus must not be introduced into the eyes of a pedestrian or a driver of a nearby vehicle. For this reason, the core 525 made of silicon nitride ($Si_3N_4$) and silicon dioxide ($SiO_2$) and having a cladding structure is used to emit infrared light, the wavelength of which is long.

In the case in which the core 525 is made of silicon nitride ($Si_3N_4$) and silicon dioxide ($SiO_2$) and has a cladding structure, the characteristics of coupling between a chip and a fiber array are excellent.

FIGS. 10A and 10B are diagrams illustrating examples of an optical steering unit (e.g., optical steering unit 530 in FIG. 5) according to an implementation.

As shown in FIG. 10A, an optical steering unit may include an optical phased array 1010, which may include a plurality of individual arrays 1010a, 1010b, 1010c, and 1010d. The individual arrays 1010a, 1010b, 1010c, and 1010d may be formed, for example, by using silicon photonics.

The optical phased array 1010 may be configured to output a plurality of beams that were split by an optical splitter (e.g., optical splitter 510 in FIG. 5). For example, the optical phased array 1010 may output the plurality of beams in a state in which the phases of the beams have been changed.

The beams that have been split (e.g., by optical splitter 510) may be introduced into the individual arrays 1010a, 1010b, 1010c, and 1010d.

The processor 570 may apply an electrical signal to the optical phased array 1010 in order to adjust the optical phase of each of the individual arrays 1010a, 1010b, 1010c, and 1010d.

For example, the processor 470 may apply a specific electrical signal to each of the individual arrays 1010a, 1010b, 1010c, and 1010d. In this case, the emission direction of the output beams may be changed. The output beams may be referred to as transmission light.

The processor 470 may change the electrical signal applied to the optical phased array 1010. In this case, the emission angle of the output beams may be changed.

For example, when the electrical signal applied to the optical phased array 1010 is changed under the control of the processor 470, the emission angle of the output light is also changed. As such, the processor 470 may adaptively control the emission angle of the output light by controlling the electrical signal applied to the optical phased array 1010.

The maximum value of the changed emission angle corresponds to the field of view (FOV) of detection. As such, the processor 470 may adjust the electrical signal applied to the optical phased array 1010 in order to vary the field of view (FOV) of the output light.

For example, the optical splitter 510 may split the light generated by the optical generation unit 417, and may change the phases of the split beams. The beams that are split by the optical splitter 510 and phase-changed may be introduced into the individual arrays 1010a, 1010b, 1010c, and 1010d. The processor 470 may control the optical splitter 510 such that the emission angle of the beams output from the optical steering unit 530 is adjusted.

Referring to FIG. 10A, when the phases of the beams incident on the individual arrays 1010a, 1010b, 1010c, and 1010d are changed, a wavefront, which represents an interconnection of beams having the same phase, is bent. Since the advancing direction of the beams is perpendicular to the wavefront, the advancing direction of the beams is refracted at a predetermined angle. When the phase delay value of the beams introduced into the individual arrays 1010a, 1010b, 1010c, and 1010d is changed, the refracted angle of the beams may be changed as represented in Equation 1.

For example, the emission angle of the beams that are output from the optical steering unit 530 may be represented as in Equation 1, below.

$$I = I_0 \left[ \frac{\sin\left(\frac{\pi a}{\lambda}\sin\theta\right)}{\frac{\pi a}{\lambda}\sin\theta} \right]^2 \cdot \left[ \frac{\sin\left(\frac{N\pi d}{\lambda}(\sin\theta - \sin\phi)\right)}{N \cdot \sin\left(\frac{\pi d}{\lambda}(\sin\theta - \sin\phi)\right)} \right]^2 \quad \text{Equation 1}$$

Where "N" indicates the number of individual arrays, "a" indicates the size of each of the individual arrays, indicates the distance between the individual arrays, "Φ" indicates a phase delay, "λ" indicates the wavelength of light, "θ" indicates the emission angle, "$I_0$" indicates a peak intensity, and "I" indicates an intensity in the θ direction.

FIG. 10B shows the intensity of the steered beams depending on the phase delay on the assumption that N=100, a=λ/2, and d=λ/2.

As shown in FIG. 10B, the intensity of light at a desired angle is increased as the phase delay value is changed, whereby the beams are steered. When the steering angle is increased, the intensity of the output light decreases.

Reference numeral 1051 indicates the case in which the phase delay angle is 0 degrees, reference numeral 1052 indicates the case in which the phase delay angle is 40 degrees, and reference numeral 1053 indicates the case in which the phase delay angle is 70 degrees.

FIGS. 11A to 11C are reference views illustrating an optical steering unit according to another implementation.

Referring to FIG. 11A, the lidar apparatus 400 may further include a lens 1120.

The optical steering unit 530 may include an optical switch 1110. For example, the optical switch 1110 may be arrayed waveguide grating (AWG).

The optical switch 1110 is an optical device that selects the path of advancement of light based on an electrical signal applied by the processor 470.

The processor 470 may control the optical switch 1110 so as to adjust the path of light. The processor 470 may provide an electrical signal to the optical switch 1110. The optical switch 1110 may enable light to be emitted from a predetermined point (one of the points 1110*a* to 1110*g*) located in front of the lens 1120 based on the electrical signal provided by the processor 470. Since the point from which the light is emitted is changed depending upon the electrical signal applied to the optical switch 1110, the path of advancement of the beam output through the lens 1120 is changed. The processor 470 may change the electrical signal applied to the optical switch 1110 so as to steer the output beam. The steering change value may be changed so as to change the field of view. Meanwhile, the output beam may be referred to as transmission light.

Referring to FIG. 11B, the emission angle of the beam through the optical switch 1110 may be acquired as represented in Equation 2.

$$\theta = \tan^{-1}\left(\frac{\Delta x}{f}\right) \quad \text{Equation 2}$$

Where Δx indicates the change in position of a light emission point through the optical switch 1110, f indicates the focal distance of the lens 1120, and θ indicates an emission angle.

Referring to FIG. 11C, in the case in which the focal distance f of the lens 1120 is 5.0 mm, the emission angle θ is changed depending on the change Δx in position of the light emission point, as shown in the graph.

The examples described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the implementations set forth herein in all terms, but should be considered by way of example. The scope of the present disclosure should be determined by the reasonable interpretation of the accompanying claims and all changes in the equivalent range of the present disclosure are intended to be included in the scope of the present disclosure.

Although some examples have been described with reference to a number of illustrative implementations thereof, other modifications and implementations may fall within the spirit and scope of this disclosure. For example, variations and modifications may be made in the component parts and/or arrangements of the subject combination arrangement within the scope of the disclosure, the drawings and the appended claims. In addition to variations and modifications in the component parts and/or arrangements, alternatives uses may also be made.

What is claimed is:

1. A light detection and ranging (lidar) apparatus for a vehicle, the lidar apparatus comprising:
   a transmission unit configured to output transmission light;
   a reception unit configured to receive reflection light that results from the transmission light being reflected by an object;
   an interface unit; and
   at least one processor configured to:
      receive information regarding a driving state of the vehicle through the interface unit, wherein the information regarding the driving state of the vehicle comprises information regarding an object located outside the vehicle,
      based on the driving state of the vehicle, adjust an angle of beam steering of the transmission light, and
      based on a distance between the vehicle and the object, adjust the angle of beam steering of the transmission light to thereby decrease at least one of a field of view in a horizontal direction or a field of view in a vertical direction based on an increase of the distance between the vehicle and the object.

2. The lidar apparatus according to claim 1, wherein the information regarding the driving state of the vehicle further comprises first information sensed in the vehicle.

3. The lidar apparatus according to claim 2, wherein the first information sensed in the vehicle comprises at least one of: vehicle attitude information, vehicle driving direction information, vehicle location information, vehicle angle information, vehicle speed information, vehicle acceleration information, vehicle tilt information, vehicle forward/reverse movement information, steering-wheel rotation angle information, information regarding a pressure applied to an accelerator pedal, or information regarding a pressure applied to a brake pedal.

4. The lidar apparatus according to claim 1, wherein
   the object located outside the vehicle comprises at least one of a lane in a road, another vehicle, a pedestrian, a light, a traffic signal, a road, a structure, a bump, a geographical feature, or an animal.

5. The lidar apparatus according to claim 4, wherein the at least one processor is further configured to generate the information regarding the object based on the reflection light that is received by the reception unit.

6. The lidar apparatus according to claim 1, wherein the information regarding the driving state of the vehicle comprises information regarding another object located around the vehicle.

7. The lidar apparatus according to claim 6, wherein the at least one processor is further configured to:
   determine at least one of a time of flight (TOF) or a phase shift between the transmission light and the reflection light; and
   acquire the information regarding the object located around the vehicle based on the at least one of the TOF or the phase shift between the transmission light and the reflection light.

8. The lidar apparatus according to claim 1, wherein the transmission light comprises a Frequency Modulated Continuous Wave (FMCW).

9. The lidar apparatus according to claim 1, wherein the transmission unit comprises:

an optical generation unit configured to generate the transmission light; and an optical steering unit configured to control a direction of the transmission light.

10. The lidar apparatus according to claim 9, wherein the optical steering unit comprises an optical phased array.

11. The lidar apparatus according to claim 10, wherein the transmission unit further comprises an optical splitter configured to split an input light into a plurality of beams.

12. The lidar apparatus according to claim 11, wherein the optical phased array of the optical steering unit is configured to output a plurality of beams that were split by the optical splitter to an outside of the lidar apparatus in a state in which phases of the plurality of beams have been changed.

13. The lidar apparatus according to claim 11, wherein the transmission unit further comprises an optical guide unit configured to input, to the optical steering unit, the plurality of beams that were split by the optical splitter.

14. The lidar apparatus according to claim 13, further comprising:

a heater configured to provide heat to the optical guide unit, wherein the at least one processor is further configured to control the heater to heat the optical guide unit and change at least one phase of the plurality of beams.

15. The lidar apparatus according to claim 13, further comprising:

a piezoelectric unit configured to apply pressure to the optical guide unit, wherein the at least one processor is further configured to control the piezoelectric unit to apply pressure to the optical guide unit and change at least one phase of the plurality of beams.

16. The lidar apparatus according to claim 13, wherein the optical guide unit comprises a core that is made of silicon nitride ($Si_3N_4$) and silicon dioxide ($SiO_2$).

17. The lidar apparatus according to claim 13, wherein the optical guide unit comprises:

a silicon substrate;

a first silicon dioxide layer formed on the silicon substrate;

a second silicon dioxide layer formed on the first silicon dioxide layer;

a core formed in the second silicon dioxide layer; and a third silicon dioxide layer formed on the second silicon dioxide layer.

18. The lidar apparatus according to claim 9, wherein the optical steering unit comprises an optical switch that is configured to switch between different emission directions of the transmission light to adjust the angle of beam steering of the transmission light.

19. A vehicle comprising the lidar apparatus according to claim 1.

20. The lidar apparatus according to claim 1, wherein the at least one processor is configured to:

based on the distance within a first range from the vehicle, adjust the angle of beam steering of the transmission light to thereby set the field of view in the horizontal direction to a first angle; and based on the distance within a second range from the vehicle that is greater than the first range, adjust the angle of beam steering of the transmission light to thereby set the field of view in the horizontal direction to a second angle that is less than the first angle.

* * * * *